(12) United States Patent
Fan et al.

(10) Patent No.: US 11,843,449 B2
(45) Date of Patent: Dec. 12, 2023

(54) MEASUREMENT SYNCHRONIZATION METHOD, NETWORK DEVICE AND TERMINAL DEVICE

(71) Applicant: DATANG MOBILE COMMUNICATIONS EQUIPMENT CO., LTD., Beijing (CN)

(72) Inventors: Jiangsheng Fan, Beijing (CN); Deshan Miao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 50 days.

(21) Appl. No.: 17/631,143

(22) PCT Filed: Jun. 23, 2020

(86) PCT No.: PCT/CN2020/097772
§ 371 (c)(1),
(2) Date: Jan. 28, 2022

(87) PCT Pub. No.: WO2021/017690
PCT Pub. Date: Feb. 4, 2021

(65) Prior Publication Data
US 2022/0263569 A1    Aug. 18, 2022

(30) Foreign Application Priority Data

Jul. 29, 2019  (CN) .......................... 201910690828.7

(51) Int. Cl.
*H04B 7/185* (2006.01)
*H04W 24/10* (2009.01)
(Continued)

(52) U.S. Cl.
CPC ..... *H04B 7/18589* (2013.01); *H04B 7/18595* (2013.01); *H04W 24/10* (2013.01); *H04W 56/001* (2013.01); *H04W 84/06* (2013.01)

(58) Field of Classification Search
CPC .......... H04B 7/18589; H04B 7/18595; H04W 24/10; H04W 56/001; H04W 84/06
See application file for complete search history.

(56) References Cited

U.S. PATENT DOCUMENTS 10,153,831 B1    12/2018 Gokhale et al.
10,547,374 B1 *   1/2020 Liu ...................... H04W 52/42
(Continued)

FOREIGN PATENT DOCUMENTS

CN        107528628 A    12/2017
CN        108112281 A     6/2018
(Continued)

OTHER PUBLICATIONS

CATT. "The Impact by Propagation Delay Difference on Connected Mode Measurements" 3GPP TSG-RAN WG2 Meeting #107 R2-1908755, Aug. 16, 2019, section 2.
(Continued)

*Primary Examiner* — Deepa Belur
(74) *Attorney, Agent, or Firm* — Meunier Carlin & Curfman LLC

(57) ABSTRACT

Disclosed are a measurement synchronization method, a network device and a terminal device. The method includes: determining delay-related parameters, wherein the delay-related parameters are used to represent a delay between a satellite service link corresponding to a serving cell and a satellite service link corresponding to a neighboring cell; adjusting a measurement window according to the delay-related parameters, wherein the measurement window is acquired from measurement interval parameters configured for a network device; and measuring a synchronization signal block corresponding to the neighboring cell according to the adjusted measurement window.

18 Claims, 10 Drawing Sheets

(51) Int. Cl.
*H04W 56/00* (2009.01)
*H04W 84/06* (2009.01)

(56) References Cited

U.S. PATENT DOCUMENTS

| | | | | |
|---|---|---|---|---|
| 2015/0270890 A1* | 9/2015 | Vasavada | ............... | H04B 7/195 370/326 |
| 2016/0323800 A1* | 11/2016 | Ulupinar | ............... | H04B 7/2041 |
| 2018/0006370 A1* | 1/2018 | Hreha | ............... | H04W 56/0015 |
| 2019/0182900 A1 | 6/2019 | Cui et al. | | |
| 2020/0120530 A1 | 4/2020 | Luo et al. | | |
| 2020/0204332 A1 | 6/2020 | Da et al. | | |
| 2020/0229017 A1 | 7/2020 | Liu et al. | | |
| 2021/0227479 A1 | 7/2021 | Harada | | |
| 2022/0263570 A1* | 8/2022 | Wang | ............... | H04W 56/0045 |
| 2022/0321207 A1* | 10/2022 | Park | ............... | H04W 24/10 |

FOREIGN PATENT DOCUMENTS

| | | | | |
|---|---|---|---|---|
| CN | 109150454 A | 1/2019 | | |
| CN | 109391960 A | 2/2019 | | |
| CN | 109428695 4 | 3/2019 | | |
| CN | 109600770 A | 4/2019 | | |
| EP | 3691324 A1 | 5/2020 | | |
| TW | 201929580 A | 7/2019 | | |
| WO | WO-2005066650 A1 * | 7/2005 | ............. | G01S 19/29 |
| WO | WO-2018228270 A1 * | 12/2018 | ............... | H04L 5/00 |
| WO | 2019062567 A1 | 4/2019 | | |
| WO | 2019111862 A1 | 6/2019 | | |

OTHER PUBLICATIONS

CATT. "Measurement Issues for NTN System" 3GPP TSG-RAN WG2 Meeting #107bis R2-1912157, Oct. 3, 2019, section 3.
Huawei et al., "Discussion on SSB measurement in NTN" 3GPP TSG-RAN2 Meeting #108 R2-1915189, Oct. 3, 2019, sections 2 and 5.
Huawei et al., "Discussion on timing advance for NTN" 3GPP TSG-RAN WG1 Meeting #96 R1-1903197, Mar. 1, 2019.
ZTE, "Summary of 7.2.5.3 on UL timing and PRACH" 3GPP TSG RAN WG1 #96bis R1-1905732, Apr. 8-12, 2019.
3GPP TS 38.331, "Radio Resource Control (RRC) Protocol Specification," Valbonne, France (2019).
3GPP TSG-RAN WG2 Meeting #104, Tdoc R2-1900547, Report of email discussion [104#54] [NR-NTN], Athens, Greece, Feb. 25-Mar. 1, 2019.
Ericsson, "5G New Radio Evolution Meets Satellite Communications: Opportunities, Challenges, and Solutions".

* cited by examiner

MEASUREMENT SYNCHRONIZATION METHOD, NETWORK DEVICE AND TERMINAL DEVICE

CROSS REFERENCE TO RELATED APPLICATIONS

The present disclosure is a National Stage of International Application No. PCT/CN2020/097772, filed on Jun. 23, 2020, which claims priority to Chinese Patent Application No. 201910690828.7, filed to the Chinese Patent Office on Jul. 29, 2019 and entitled "MEASUREMENT SYNCHRONIZATION METHOD, NETWORK DEVICE AND TERMINAL DEVICE", the entire contents of which are incorporated herein by reference.

FIELD

The present disclosure relates to the field of communications, in particular to a method for measurement synchronization, a network device and a terminal device.

BACKGROUND

In a new radio (NR) measurement synchronization mechanism, a terminal device obtains synchronization measurement timing configuration (SMTC) of a target measurement cell, and quickly locates a synchronization signal block (SSB) of a frequency point of the target measurement cell according to a measurement window configured in the SMTC, so as to complete a process of downlink synchronization with the target measurement cell.

In a satellite communication system, a satellite service link has a large timing delay. Therefore, if the terminal device still measures the SSB according to the measurement window configured in the SMTC in the satellite communication system, measurement synchronization of the terminal device with the target measurement cell may fail.

SUMMARY

Embodiments of the present disclosure provide a method for measurement synchronization, a network device and a terminal device, for improving the reliability of measurement synchronization in a satellite communication system.

In a first aspect, a method for measurement synchronization is provided, including: configuring one or more measurement gap parameters for a terminal device, where the one or more measurement gap parameters include a measurement window; and sending instruction information to the terminal device, to enable the terminal device to adjust the measurement window according to the instruction information, and measure a synchronization signal block of a neighboring cell according to the adjusted measurement window, where the instruction information indicates one or more delay-related parameters between a satellite service link corresponding to a serving cell and a satellite service link corresponding to the neighboring cell.

In the embodiment of the present disclosure, after configuring the one or more measurement gap parameters for the terminal device, a network device sends the instruction information to the terminal device to instruct the one or more delay-related parameters between the satellite service link corresponding to the serving cell and the satellite service link corresponding to the neighboring cell, so the terminal device adjusts the measurement window in the one or more measurement gap parameters according to the instruction information, so as to compensate for a difference in measurement time caused by different satellite service links, improve the synchronization between the measurement window and a time domain location of the SSB, and thus improve the reliability of measurement synchronization.

In one possible implementation, the sending the instruction information to the terminal device, includes: sending the instruction information to the terminal device via broadcast system information; or sending the instruction information to the terminal device via dedicated signaling.

In one possible implementation, the instruction information includes at least one of public offset information, delay offset information, or location information; where the public offset information includes a maximum delay difference between the satellite service link corresponding to the serving cell and the satellite service link corresponding to the neighboring cell, the delay offset information includes a real-time delay difference between the satellite service link corresponding to the serving cell and the satellite service link corresponding to the neighboring cell, the location information includes a satellite identifier corresponding to the serving cell and a satellite identifier corresponding to the neighboring cell, or the location information includes a location of a gateway station, a satellite identifier corresponding to the serving cell and a satellite identifier corresponding to the neighboring cell.

In one possible implementation, the public offset information further includes symbol information, and the symbol information indicates that the maximum delay difference is a timing advance or a timing delay; and the method further includes: in a case that the symbol information needs to be updated, notifying the terminal device to update the symbol information in the following manner: sending a message of updating system information to the terminal device through a paging process, and broadcasting updated system information including updated symbol information; or sending downlink control information (DCI) to the terminal device through a paging process, where the DCI instructs the terminal device to update the symbol information.

In one possible implementation, the instruction information is the delay offset information; and after the sending the instruction information to the terminal device, the method includes: for a neighboring cell at any frequency point, in a case that a difference between a current delay difference and the delay difference in the instruction information is greater than a preset threshold, broadcasting system information including the current delay difference, or sending instruction information including the current delay difference to the terminal device through reconfigured dedicated signaling; where the current delay difference refers to a delay difference between the satellite service link corresponding to the serving cell and the satellite service link corresponding to the neighboring cell in a current time period.

In a second aspect, a method for measurement synchronization is provided, including: determining one or more delay-related parameters, where the one or more delay-related parameters represent a delay between a satellite service link corresponding to a serving cell and a satellite service link corresponding to a neighboring cell; adjusting a measurement window according to the one or more delay-related parameters, where the measurement window is obtained from one or more measurement gap parameters configured by a network device; and measuring a synchronization signal block corresponding to the neighboring cell according to the adjusted measurement window.

In one possible implementation, before the determining the one or more delay-related parameters, the method includes: receiving instruction information via broadcast system information; or receiving instruction information via dedicated signaling sent by the network device; where the instruction information indicates the one or more delay-related parameters.

In one possible implementation, the instruction information includes one or more of public offset information, delay offset information, or location information; where the public offset information includes a maximum delay difference between the satellite service link corresponding to the serving cell and the satellite service link corresponding to the neighboring cell, the delay offset information includes a real-time delay difference between the satellite service link corresponding to the serving cell and the satellite service link corresponding to the neighboring cell, the location information includes a satellite identifier corresponding to the serving cell and a satellite identifier corresponding to the neighboring cell, or the location information includes a location of a gateway station, a satellite identifier corresponding to the serving cell and a satellite identifier corresponding to the neighboring cell.

In one possible implementation, the public offset information further includes symbol information, the symbol information indicates that the maximum delay difference is a timing advance or a timing delay, and the method further includes: receiving a message of updating system information sent through a paging process, and receiving updated symbol information or an updated current delay difference for a neighboring cell at a specific frequency point through broadcast updated system information; where the current delay difference refers to a delay difference between the satellite service link corresponding to the serving cell and the satellite service link corresponding to the neighboring cell in a current time period; or receiving instruction information including an updated current delay difference for a neighboring cell at a specific frequency point through reconfigured dedicated signaling; or receiving DCI sent by the network device through a paging process, and updating the symbol information according to an instruction of the DCL.

In one possible implementation, the determining the one or more delay-related parameters, includes: determining the one or more delay-related parameters between the satellite service link corresponding to the serving cell and the satellite service link corresponding to the neighboring cell according to a location of a gateway station, a pre-stored ephemeris, a satellite identifier corresponding to the serving cell, and a satellite identifier corresponding to the neighboring cell, or according to location information of a terminal device, a location of a gateway station, a pre-stored ephemeris, a satellite identifier corresponding to the serving cell, and a satellite identifier corresponding to the neighboring cell.

In one possible implementation, before the measuring the synchronization signal block corresponding to the neighboring cell according to the adjusted measurement window, the method further includes: determining an included angle between an antenna of a terminal device and a satellite corresponding to the neighboring cell according to a pre-stored ephemeris, a satellite identifier corresponding to the serving cell, and a satellite identifier corresponding to the neighboring cell; and adjusting the antenna of the terminal device to a direction aligned with the satellite corresponding to the neighboring cell according to the included angle.

In one possible implementation, the adjusting the measurement window according to the one or more delay-related parameters, includes: in a case that the public offset information does not include symbol information, advancing a starting time of the measurement window by the maximum delay difference, and prolonging a duration of the measurement window by twice the maximum delay difference; in a case that the public offset information includes symbol information, and the symbol information indicates that the maximum delay difference is a timing delay, prolonging a duration of the measurement window by the maximum delay difference; and in a case that the public offset information includes symbol information, and the symbol information indicates that the maximum delay difference is a timing advance, advancing the starting time of the measurement window by the maximum delay difference, and prolonging a duration of the measurement window by the maximum delay difference.

In a third aspect, a method for measurement synchronization is provided, including: determining one or more delay-related parameters between a satellite service link corresponding to a serving cell and a satellite service link corresponding to a neighboring cell; determining a first measurement gap parameter according to the one or more delay-related parameters, where the first measurement gap parameter includes a measurement window; and sending the first measurement gap parameter to a terminal device.

In the embodiment of the present disclosure, before configuring the first measurement gap parameter for the terminal device, a network device determines the one or more delay-related parameters between the satellite service link corresponding to the serving cell and the satellite service link corresponding to the neighboring cell, and determine a corresponding measurement gap parameter according to the one or more delay-related parameters, that is, the first measurement gap parameter received by the terminal device takes a delay difference between the satellite service link corresponding to the serving cell and the satellite service link corresponding to the neighboring cell into consideration, so when the terminal device measures an SSB of the neighboring cell according to the first measurement gap parameter, the measurement window in the first measurement gap parameter may be synchronous with a time domain location of the SSB, thereby improving the reliability of measurement synchronization.

In one possible implementation, the determining the one or more delay-related parameters between the satellite service link corresponding to the serving cell and the satellite service link corresponding to the neighboring cell, includes: determining a propagation distance difference between the satellite service link corresponding to the serving cell and the satellite service link corresponding to the neighboring cell according to a location of a gateway station, a pre-stored ephemeris, a satellite identifier corresponding to the serving cell, and a satellite identifier corresponding to the neighboring cell; or determining a propagation distance difference between the satellite service link corresponding to the serving cell and the satellite service link corresponding to the neighboring cell according to a location of the terminal device, a location of a gateway station, a pre-stored ephemeris, a satellite identifier corresponding to the serving cell, and a satellite identifier corresponding to the neighboring cell; and determining the one or more delay-related parameters between the satellite service link corresponding to the serving cell and the satellite service link corresponding to the neighboring cell according to the propagation distance difference.

In one possible implementation, the sending the first measurement gap parameter to the terminal device, includes: sending the first measurement gap parameter to the terminal device via broadcast system information; or sending the first measurement gap parameter to the terminal device via dedicated signaling.

In one possible implementation, the one or more delay-related parameters include at least one of public offset information or delay offset information; and the public offset information includes a maximum delay difference between the satellite service link corresponding to the serving cell and the satellite service link corresponding to the neighboring cell, and the delay offset information includes a real-time delay difference between the satellite service link corresponding to the serving cell and the satellite service link corresponding to the neighboring cell.

In one possible implementation, the public offset information further includes symbol information, and the symbol information indicates that the maximum delay difference is a timing advance or a timing delay; and after the sending the first measurement gap parameter to the terminal device, the method further includes: in a case that the symbol information needs to be updated, determining a second measurement gap parameter according to updated symbol information; and sending a message of updating system information to the terminal device through a paging process, and broadcasting system information including the second measurement gap parameter; or sending downlink control information (DCI) or a paging message scheduled by DCI to the terminal device through a paging process, where the DCI and the paging message scheduled by the DCI carry the second measurement gap parameter.

In one possible implementation, the one or more delay-related parameters are the delay offset information; and after the sending the first measurement gap parameter to the terminal device, the method further includes: in a case that a difference between a current delay difference and the delay difference of the one or more delay-related parameters is greater than a preset threshold, or after a preset time period, determining a third measurement gap parameter according to the current delay difference; and sending the third measurement gap parameter to the terminal device; where the current delay difference refers to a delay difference between the satellite service link corresponding to the serving cell and the satellite service link corresponding to the neighboring cell in a current time period.

In a fourth aspect, a method for measurement synchronization is provided, including: receiving a first measurement gap parameter sent by a network device, where the first measurement gap parameter indicates a measurement window actually corresponding to a synchronization signal block sent by a satellite service link corresponding to a neighboring cell in a serving cell; and measuring the synchronization signal block corresponding to the neighboring cell according to the measurement window.

In one possible implementation, the receiving the first measurement gap parameter sent by the network device, includes: receiving the first measurement gap parameter via broadcast system information; or receiving the first measurement gap parameter via dedicated signaling.

In one possible implementation, after the receiving the first measurement gap parameter sent by the network device, the method includes: receiving a message of updating system information sent through a paging process, and receiving system information including a second measurement gap parameter; or, receiving downlink control information (DCI) or a paging message scheduled by DCI through a paging process, where the DCI and the paging message scheduled by the DCI indicate the second measurement gap parameter; and a measurement window indicated by the second measurement gap parameter is different from the measurement window indicated by the first measurement gap parameter.

In a fifth aspect, a network device is provided, including: a processor, a memory, and a transceiver. The processor is configured to read one or more programs in the memory and execute any method of the first aspect.

In a sixth aspect, a terminal device is provided, including: a processor, a memory, and a transceiver. The processor is configured to read one or more programs in the memory and execute any method of the second aspect.

In a seventh aspect, a network device is provided, including: a processor, a memory, and a transceiver. The processor is configured to read one or more programs in the memory and execute any method of the third aspect.

In an eighth aspect, a terminal device is provided, including: a processor, a memory, and a transceiver. The processor is configured to read one or more programs in the memory and execute any method of the fourth aspect.

In a ninth aspect, a network device is provided, including: a configuration module, configured to configure one or more measurement gap parameters for a terminal device, where the one or more measurement gap parameters include a measurement window; and a sending module, configured to send instruction information to the terminal device to enable the terminal device to adjust the measurement window according to the instruction information, and measure a synchronization signal block of a neighboring cell according to the adjusted measurement window, where the instruction information indicates one or more delay-related parameters between a satellite service link corresponding to a serving cell and a satellite service link corresponding to the neighboring cell.

In a tenth aspect, a terminal device is provided, including: a determining module, configured to determine one or more delay-related parameters, where the one or more delay-related parameters represent a delay between a satellite service link corresponding to a serving cell and a satellite service link corresponding to a neighboring cell; an adjusting module, configured to adjust a measurement window according to the one or more delay-related parameters, where the measurement window is obtained from one or more measurement gap parameters configured by a network device; and a measuring module, configured to measure a synchronization signal block corresponding to the neighboring cell according to the adjusted measurement window.

In an eleventh aspect, a network device is provided, including: a determining module, configured to determine one or more delay-related parameters between a satellite service link corresponding to a serving cell and a satellite service link corresponding to a neighboring cell, and determine a first measurement gap parameter according to the one or more delay-related parameters; where the first measurement gap parameter includes a measurement window; and a sending module, configured to send the first measurement gap parameter to a terminal device.

In a twelfth aspect, a terminal device is provided, including: a receiving module, configured to receive a first measurement gap parameter sent by a network device, where the first measurement gap parameter indicates a measurement window actually corresponding to a synchronization signal block sent by a satellite service link corresponding to a neighboring cell in a serving cell; and a measuring module, configured to measure the synchronization signal block corresponding to the neighboring cell according to the measurement window.

In a thirteenth aspect, a computer-readable storage medium is provided, storing computer instructions. When the computer instructions run on a computer, the computer executes the method according to any one of the first aspect, the second aspect, the third aspect or the fourth aspect.

DETAILED DESCRIPTION OF THE EMBODIMENTS

Figure 1:
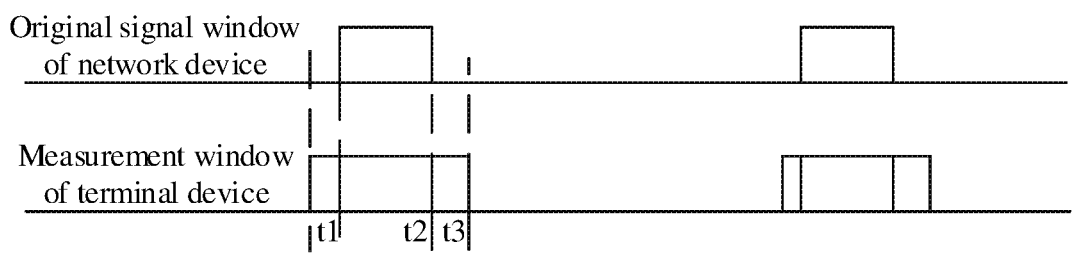
FIG. 1 is a schematic diagram of a measurement window in an embodiment of the present disclosure.

In order to better understand the technical solutions provided by the embodiments of the present disclosure, a detailed description will be given below in conjunction with the accompanying drawings of the specification and specific implementations.

In order to facilitate those skilled in the art to better understand the technical solutions of the present disclosure, the technical terms involved in the present disclosure are explained below.

Synchronization measurement timing configuration includes an SSB periodicity, an offset of a starting time of an SSB relative to the SSB periodicity, and a duration of the SSB in the SSB periodicity.

Measurement gap (MP) includes a repetition periodicity of a measurement gap, an offset of an actual starting time of the measurement gap relative to a starting time of a measurement gap periodicity, a duration of the measurement gap, and a timing advance of a starting time of the measurement gap.

Ephemeris includes orbiting data information and/or satellite identifiers of satellites in a service region where a terminal is located. The orbiting data information of the satellites includes, for example, when the satellites orbit the earth, which places on the earth the satellites will bypass, and at what point in time the satellites will bypass the places. The satellite identifiers indicate the corresponding satellites, and each satellite has a unique identifier, such as a number, a character, or a combination of a number and a character, which is not specifically limited in the present disclosure.

For example, an ephemeris is as the following Table 1.

TABLE 1

| Satellite(s) | Orbiting data information | Identifier information |
|---|---|---|
| Satellite 1 | Beijing (16), Shanghai (17), Anhui (20), and Chongqing (21) | 1 |
| Satellite 2 | Shanghai (16), Nanjing (17), and Hangzhou (21) | 2 |
| Satellite 3 | Beijing (16), Shenyang (17), and Lianyungang (20) | 3 |
| Satellite 4 | Xi'an (16), Gansu (17), and Chengdu (21) | 4 |

As shown in Table 1, Satellite 1 may bypass Beijing at 16 o'clock Beijing time, Shanghai at 17 o'clock Beijing time, Anhui at 20 o'clock Beijing time, Chongqing at 21 o'clock Beijing time, etc. Satellite 2 bypasses Shanghai at 16 o'clock Beijing time, Nanjing at 17 o'clock Beijing time, and Hangzhou at 21 o'clock Beijing time. Satellite 3 bypasses Beijing at 16 o'clock Beijing time, Shenyang at 17 o'clock Beijing time, and Lianyungang at 20 o'clock Beijing time. Satellite 4 bypasses Xi'an at 16 o'clock Beijing time, Gansu at 17 o'clock Beijing time, and Chengdu at 21 o'clock Beijing time.

Terminal device: a terminal device is a wireless terminal or a wired terminal. The wireless terminal may refer to a device that provides voice and/or other service data connectivity for a user, a handheld device with a wireless connection function, or other processing devices connected to a wireless modem. The wireless terminal may communicate with one or more core networks via a radio access network (RAN). The wireless terminal may be a mobile terminal, such as a mobile phone (or referred to as a "cellular" phone) and a computer with a mobile terminal. For example, the wireless terminal may be a portable, pocket-sized, handheld, computer-built or vehicle-mounted mobile device that exchanges language and/or data with the radio access network, for example, a personal communication service (PCS) phone, a cordless phone, a session initiation protocol (SIP) phone, a wireless local loop (WLL) station, a personal digital assistant (PDA), etc. The wireless terminal may also be referred to as a system, a subscriber unit, a subscriber station, a mobile station, a mobile, a remote station, a remote terminal, an access terminal, a user terminal, a user agent, and a user device or user equipment. It should be noted that terminal devices herein all refer to terminal devices in a satellite communication system.

Network device: a network device refers to a network device in the satellite communication system. The network device may be a base station, such as a base transceiver station (BTS) in GSM or CDMA, NodeB (NB) in a WCDMA system, or evolutional NodeB (eNB or eNodeB) in an LTE system. The network device may also be a wireless controller in a cloud radio access network (CRAN) scenario. The network device may also be a relay station, an access point, a vehicle-mounted device, a wearable device, and a network device in a future 5G network or a network device in a future evolved PLMN.

Satellite service link: a satellite service link may be understood as a communication link including one or more gateway stations, one or more satellites, one or more network devices and one or more terminal devices.

In order to facilitate those skilled in the art to better understand the technical solutions in the embodiments of the present disclosure, a current measurement synchronization mechanism will be described in detail below.

In order to avoid interference, SSBs of different neighboring cells around a cell are staggered in time domain locations. In other words, the time domain locations of the SSBs of the different neighboring cells are different. Before switching from a serving cell to another cell, the terminal device needs to measure a signal of a cell to be switched. Before measuring the cell signal, downlink synchronization with the cell needs to be completed first. In NR, SMTC corresponding to the neighboring cell is sent to the terminal device. After obtaining the SMTC, the terminal device determines a measurement window, measures an SSB on the measurement window, and completes downlink synchronization with the neighboring cell.

For a terminal device in an idle state or in an inactive state, a network device may broadcast the SMTC of the neighboring cell through system information. After obtaining the SMTC, the terminal device may try to measure the SSB of the neighboring cell. The terminal device in the idle state or in the inactive state can only wake up once in a discontinuous reception (DRX) periodicity, so the terminal device may search for the SSB according to the SMTC of the corresponding neighboring cell within the waking time, so as to complete synchronous measurement. There is no data scheduling for the terminal device in the idle state or in the inactive state, so there is no need to configure a measurement gap (MP) for the terminal device in the idle state or in the inactive state.

For a terminal device in a connected state, a network device with measurement configuration configures measurement configuration information corresponding to a measurement object (MO) to the terminal device through dedicated signaling, where the measurement configuration information includes one or more frequency points of the measurement object and SMTC configured at different frequency points. The terminal device is synchronized to a corresponding SSB according to the SMTC configured at different frequency points. Because the terminal device in the connected state has data service scheduling, the network device may configure the MP for the terminal device. After the terminal device obtains the MP, the terminal device only needs to be synchronized to a corresponding neighboring cell according to the SMTC within the MP, which avoids mutual conflict of data scheduling of a measured cell and the serving cell.

FIG. 1 is a schematic diagram of a measurement window determined by a terminal device according to SMTC. The measurement window of the terminal device is slightly larger than an original signal window of a network device. In FIG. 1, t1 represents reserved preparation time required for measurement, t2 is aligned with the original signal window of the network device, and t3 represents remaining redundant time. The redundant time is to improve the reliability of the measurement. The original signal window of the network device may be understood as a time domain location of the SSB corresponding to the neighboring cell.

In a satellite communication system, due to a propagation path between a satellite service link corresponding to the serving cell and a satellite service link corresponding to the neighboring cell has a distance difference, there may be a large delay between a measurement window of the SMTC received by the terminal device and an actual time domain location of the SSB of the neighboring cell. In the case that the terminal device still measures the SSB of the neighboring cell according to the SMTC configured in the above measurement synchronization mechanism, the terminal device may not be able to measure out the SSB in the corresponding measurement window, resulting in a failure of measurement synchronization.

Figure 2:
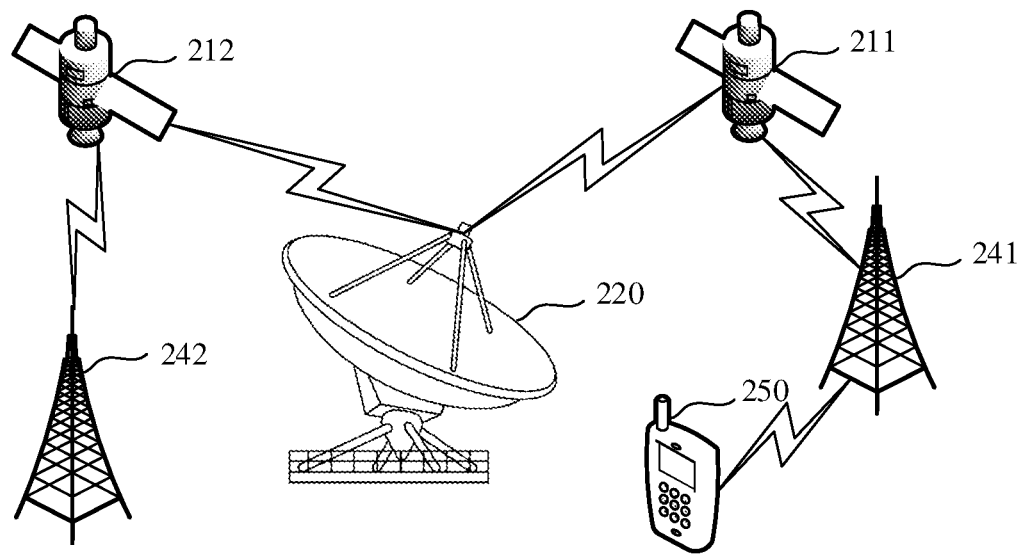
FIG. 2 is an application scenario diagram of a method for measurement synchronization provided by an embodiment of the present disclosure.

In view of this, an embodiment of the present disclosure provides a first method for measurement synchronization. As shown in FIG. 2, FIG. 2 is an application scenario diagram of the method. The application scenario includes a first satellite 211, a second satellite 212, a gateway station 220, a first network device 241, a second network device 242, and a terminal device 250.

Specifically, the first satellite 211 and the second satellite 212 may communicate with the gateway station 220. The first satellite 211 and the first network device 241 communicate with each other. The second satellite 212 and the second network device 242 communicate with each other. When the terminal device 250 is within a service range of the first network device 241, the terminal device 250 may communicate with the first network device 241, and receive information broadcast by the first network device 241.

FIG. 2 shows that two satellites are served by the same gateway station 220. In fact, two satellites may also be served by different gateway stations. FIG. 2 takes two satellites as an example, but in fact, the quantity of satellites is not limited. FIG. 2 takes two network devices as an example, but in fact, the quantity of network devices is not limited.

Figure 3:
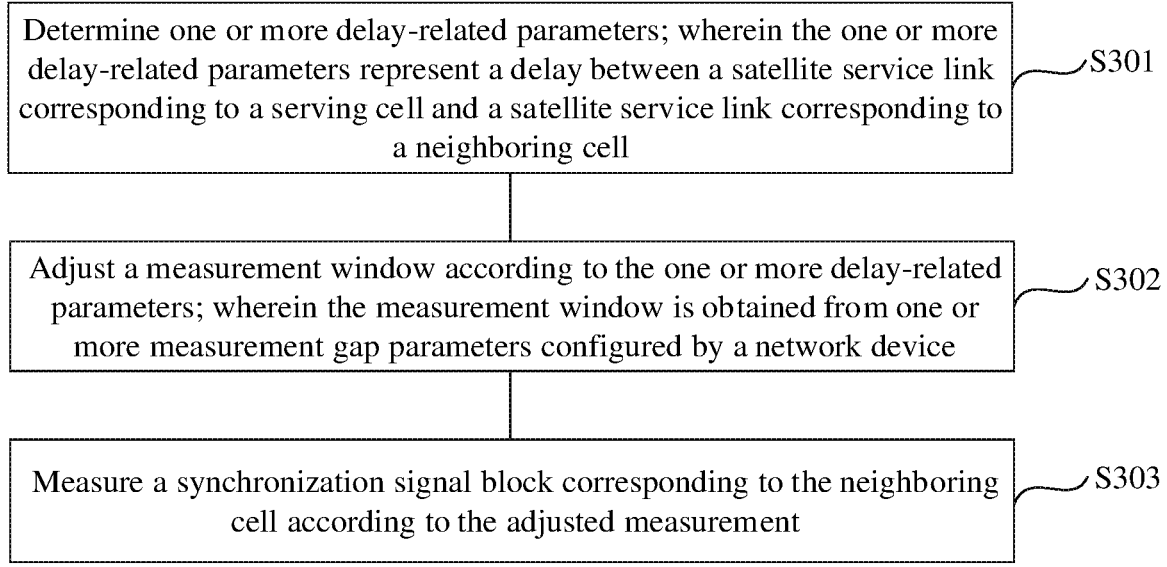
FIG. 3 is a first schematic flowchart of a first method for measurement synchronization provided by an embodiment of the present disclosure.

Based on the application scenario shown in FIG. 2, the first method for measurement synchronization provided by the present disclosure is introduced below. As shown in FIG. 3, the method includes S301, S302 and S303.

S301, one or more delay-related parameters are determined.

The one or more delay-related parameters represent a delay between a satellite service link corresponding to a serving cell and a satellite service link corresponding to a neighboring cell.

S302, a measurement window is adjusted according to the one or more delay-related parameters. The measurement window is obtained from one or more measurement gap parameters configured by the network device.

S303, a synchronization signal block corresponding to the neighboring cell is measured according to the adjusted measurement window.

In the embodiment of the present disclosure, the terminal device 250 determines the one or more delay-related parameters between the satellite service link corresponding to the serving cell and the satellite service link corresponding to the neighboring cell, and adjusts the measurement window according to the one or more delay-related parameters, so as to improve the reliability of measurement synchronization.

A satellite corresponding to the serving cell and a satellite corresponding to the neighboring cell may be the same satellite or two adjacent satellites. In either case, there is a delay difference between the satellite service link corresponding to the serving cell and the satellite service link corresponding to the neighboring cell. Delay differences in different cases are different.

In the embodiments of the present disclosure, the first network device 241 needs to configure the one or more measurement gap parameters for the terminal device 250. the configuration of the one or more measurement gap parameters is described in detail below.

Figure 4:
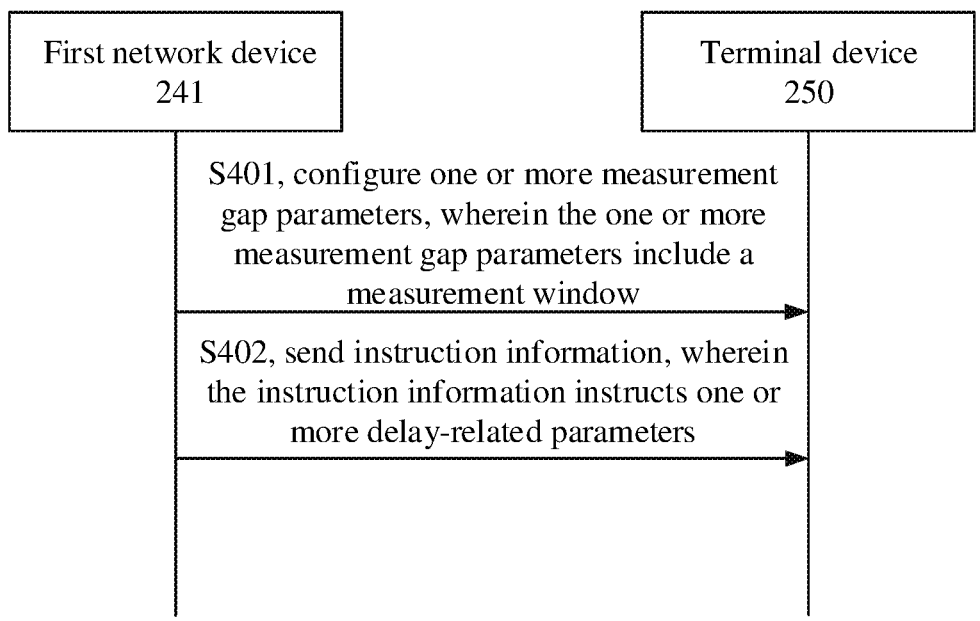
FIG. 4 is a schematic diagram of an interaction process involved in a first method for measurement synchronization provided by an embodiment of the present disclosure.

As shown in FIG. 4: S401, the first network device 241 configures the one or more measurement gap parameters for the terminal device 250; S402, the first network device 241 sends instruction information to the terminal device 250 to instruct the one or more delay-related parameters. The one or more measurement gap parameters include the measurement window.

Manner 1 to execute S401 is shown below.

The first network device 241 configures the one or more measurement gap parameters for the terminal device 250 through dedicated signaling.

Specifically, for example, when the terminal device 250 is in a connected state, the first network device 241 may configure one or more measurement gap parameters of each neighboring cell for the terminal device 250 through the dedicated signaling.

The dedicated signaling includes, for example, radio resource control (RRC) signaling. The specific type of the dedicated signaling is not limited in the embodiments of the present disclosure. The one or more measurement gap parameters may be understood as parameters configured to instruct the terminal device to measure a time domain location of an SSB of the neighboring cell, and may be understood as synchronization measurement timing configuration mentioned in the background. The one or more measurement gap parameters include the measurement window. The measurement window specifically includes a starting time of the measurement window, a duration of the measurement window, and a periodicity of the measurement window.

Manner 2 to execute S401 is shown below.

The first network device 241 broadcasts the one or more measurement gap parameters of the neighboring cells through system information.

Specifically, for example, when the terminal device 250 is in an idle state or an inactive state, the first network device may broadcast the one or more measurement gap parameters of each neighboring cell through the system information, and the terminal device 250 may receive the one or more measurement gap parameters when waking up in a DRX periodicity. The content of the one or more measurement gap parameters refers to content discussed in Manner 1, which will not be repeated here.

Since the one or more measurement gap parameters are different for different neighboring cells, in a possible embodiment, in order to facilitate the terminal device 250 to identify the one or more measurement gap parameters corresponding to each neighboring cell, the first network device 241 may broadcast the one or more measurement gap parameters of different cells according to frequency points.

After the first network device 241 configures the one or more measurement gap parameters for the terminal device 250, the terminal device 250 obtains the one or more measurement gap parameters.

After introducing the overall idea of the first method for measurement synchronization in the embodiments of the present disclosure, the execution process of each step in the embodiments of the present disclosure will be described in detail below, and the execution manner of S301 is described below first.

In S301, Type 1: the terminal device 250 may determine the one or more delay-related parameters according to the instruction information sent by the first network device 241, and Type 2: the terminal device determines the one or more delay-related parameters according to information stored by itself.

The following describes the situation where the first network device 241 delivers the instruction information.

Type 1.

In consideration of the one or more delay-related parameters between the satellite service link corresponding to the serving cell and the satellite service link of the neighboring cell, after the one or more measurement gap parameters are configured for the terminal device 250, the first network device 241 executes S302, and the terminal device 250 adjusts the measurement window according to the instruction information.

The instruction information indicates the one or more delay-related parameters between the satellite service link corresponding to the serving cell and the satellite service link corresponding to the neighboring cell. The one or more delay-related parameters may be understood as indirectly or directly instructing a delay difference between the satellite service link corresponding to the serving cell and the satellite service link corresponding to the neighboring cell.

The following describes the situation where the instruction information is sent by the first network device 241. For different instruction information, manners in which the first network device 241 obtains specific content of the instruction information are different, which will be described with examples below.

A first type of instruction information: public offset information.

The public offset information includes a maximum delay difference between the satellite service link corresponding to the serving cell and the satellite service link corresponding to the neighboring cell. The following describes a manner in which the first network device 241 obtains the first instruction information. When the instruction information is the public offset information, after obtaining the instruction information, the terminal device 250 determines the one or more delay-related parameters. The one or more delay-related parameters are the public offset information.

A1: The first network device 241 determines the maximum delay difference according to a maximum propagation path difference between the satellite service link corresponding to the serving cell and the satellite service link corresponding to the neighboring cell.

In the embodiments of the present disclosure, the earth being a sphere is taken as a reference standard. Satellites can continuously run in predetermined orbits. With running of each satellite, a propagation path difference between service links of different satellites may also continuously change. Due to a relatively fixed speed and direction of each satellite, there is always a corresponding maximum propagation path difference between satellite service links corresponding to two satellites, and the maximum propagation path difference is a maximum difference between propagation paths of the satellite service links of the two satellites.

Specifically, the first network device 241 may determine a communication distance among a satellite corresponding to the serving cell, the gateway station 220 and the terminal device 250 as well as a communication distance among a satellite corresponding to the neighboring cell, the gateway station 220 and the terminal device 250 according to a location of the gateway station 220, a location of the terminal device 250, an ephemeris, a satellite identifier corresponding to the serving cell, and a satellite identifier corresponding to the neighboring cell, so as to determine the maximum propagation path difference between the satellite service link corresponding to the serving cell and the satellite service link corresponding to the neighboring cell, and then determine the maximum delay difference.

Figure 5:
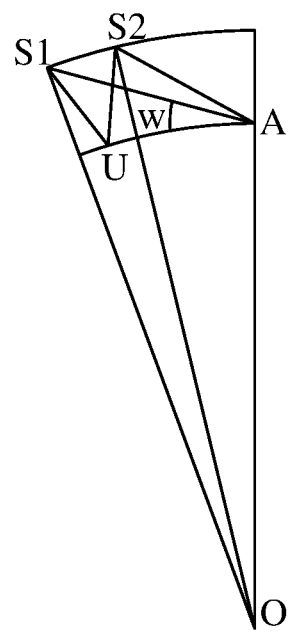
FIG. 5 is a schematic location distribution diagram of a gateway station, satellites, and a terminal device provided by an embodiment of the present disclosure.
Figure 6:
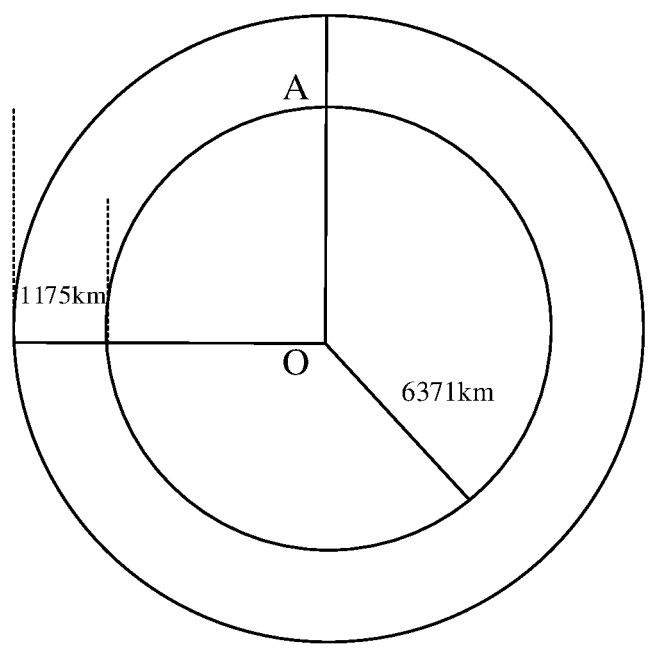
FIG. 6 is a schematic cross-sectional view of a schematic location distribution diagram corresponding to FIG. 5 provided by an embodiment of the present disclosure.

For example, taking FIG. 5 as an example, FIG. 6 is a schematic cross-sectional view of a location distribution diagram corresponding to FIG. 5, where in FIG. 5, point O represents the center of the earth, A represents the gateway station 220, S1 represents the first satellite 211, and S2 represents the second satellite 212. The first satellite 211 is a satellite having an elevation angle of 15° relative to the gateway station 220 (the elevation angle is an included angle shown by w in FIG. 5). A distance difference between the first satellite 211 and the second satellite 212 is 900 km, and the average radius of the earth is 6371 km, so a distance difference between the first satellite service link U-S1-A corresponding to the serving cell and the second satellite service link U-S2-A corresponding to the neighboring cell may be figured out as 707 km. It is determined that within the service range of the gateway station 220, the propagation path difference between the first satellite service link U-S1-A and the second satellite service link U-S2-A is [−707 km, 707 km], a delay difference range is [−2.356 ms, 2.356 ms], and thus the maximum delay difference is determined as 2.356 ms.

A2: The first network device 241 is pre-configured with the maximum delay difference.

Specifically, each network device may be pre-configured with the maximum delay difference, and the first network device 241 does not need to perform corresponding calculations.

In a possible embodiment, the public offset information includes symbol information, and the symbol information is configured to instruct whether the satellite service link corresponding to the serving cell is advanced or delayed relative to the satellite service link corresponding to the neighboring cell. In other words, the symbol information may further theoretically instruct that the maximum delay difference is a timing advance or a timing delay.

For example, "−" in "−2 ms" represents that the maximum delay difference between the satellite service link corresponding to the serving cell and the satellite service link corresponding to the neighboring cell is the timing delay. "+" in "+2 ms" represents that the maximum delay difference between the satellite service link corresponding to the serving cell and the satellite service link corresponding to the neighboring cell is the timing advance.

It should be noted that in the embodiments of the present disclosure, the symbol information is described in terms of the satellite service link corresponding to the serving cell relative to the satellite service link corresponding to the neighboring cell, or in terms of the satellite service link corresponding to the neighboring cell relative to the satellite service link corresponding to the serving cell.

In the embodiments of the present disclosure, the public offset information is used as the instruction information. Since maximum delay differences between adjacent satellites are similar, the amount of calculation and the amount of information transmission of the first network device 241 may be relatively reduced.

A second type of instruction information: delay offset information.

Specifically, the delay offset information includes a real-time delay difference between the satellite service link corresponding to the serving cell and the satellite service link corresponding to the neighboring cell. Due to the change of the location of the terminal device 250, movement of the satellites, etc., the propagation path difference between the satellite service link corresponding to the serving cell and the satellite service link corresponding to the neighboring cell may change. Therefore, the delay difference between the satellite service corresponding to the serving cell and the satellite service link corresponding to the neighboring cell may also continuously change. Thus, the first network device 241 may determine the real-time delay difference between the satellite service link corresponding to the serving cell and the satellite service link corresponding to the neighboring cell in real time. When the instruction information is the delay offset information, after obtaining the instruction information, the terminal device 250 determines the one or more delay-related parameters, and the one or more delay-related parameters are the delay offset information.

In a possible embodiment, the delay offset information further includes symbol information, and the symbol information may refer to the foregoing discussion, and is configured to instruct that the delay offset information is a timing advance or a timing delay.

In the embodiments of the present disclosure, the first network device 241 may obtain the real-time delay difference in real time, and may obtain a more accurate delay difference, so as to further improve the reliability of measurement synchronization.

A third type of instruction information: location information.

The location information includes the location of the gateway station, the satellite identifier corresponding to the serving cell, and the satellite identifier corresponding to the neighboring cell.

In a possible embodiment, the location information includes the satellite identifier corresponding to the serving cell and the satellite identifier corresponding to the neighboring cell.

Specifically, the location of the gateway station is pre-configured by the first network device 241 for the terminal device 250, and the first network device 241 only needs to carry the satellite identifier corresponding to the serving cell and the satellite identifier corresponding to the neighboring cell in the instruction information.

Specifically, the first network device 241 may directly send the location information to the terminal device 250, and the terminal device 250 calculates corresponding one or more delay-related parameters according to the pre-stored ephemeris and the location information, which decreases the processing load of the first network device 241.

The ephemeris may be configured in the terminal device 250 in advance, or may be sent to the terminal device 250 by the first network device 241. The source of the ephemeris in the terminal device 250 is not limited in the present disclosure. Content of the ephemeris may refer to the content discussed above, which will not be repeated here.

A fourth type of instruction information: a combination of any two or three of the public offset information, the delay offset information, and the location information.

Specifically, the first network device 241 may obtain the public offset information, the delay offset information, and the location information in the manners discussed above, and may send a combination of any two or three of the public offset information, the delay offset information and the location information to the terminal device 250.

After obtaining the instruction information, the first network device 241 sends the instruction information to the terminal device 250. Regardless of which of the instruction information above, there are various manners in which the first network device 241 sends the instruction information to the terminal device 250. The specific sending manners will be described below.

B1: The instruction information is sent to the terminal device 250 through dedicated signaling.

Specifically, the first network device 241 may send the instruction information to the terminal device 250 through the dedicated signaling. The dedicated signaling may refer to the content discussed above, which will not be repeated here.

B2: The instruction information is sent to the terminal device 250 through broadcast system information.

Specifically, the first network device 241 may carry the instruction information in the system information, and the terminal device 250 obtains the instruction information through the system information.

As an embodiment, no matter which sending method is adopted, when the instruction information is the delay offset information, since there may be more than one neighboring cell, and there are different real-time delay differences between the satellite link corresponding to each neighboring cell and the satellite link corresponding to the serving cell, in the embodiment of the present disclosure, the first network device 241 sends instruction information corresponding to the neighboring cells respectively according to frequency points and cell identifiers. The terminal device 250 determines a timing delay between the satellite link corresponding to each neighboring cell and the satellite link corresponding to the serving cell according to the cell identifiers, the frequency points, and the instruction information.

As an embodiment, since the satellites are arranged at equal intervals, the maximum propagation path difference between any two adjacent satellites may be regarded as equal, so the maximum delay difference between any two adjacent satellites may be regarded as the same. When the instruction information is the public offset information, the first network device 241 may broadcast the instruction information without distinguishing between cells, and the public offset information in the instruction information may be used as instruction information corresponding to all neighboring cells.

After the first network device 241 sends the instruction information, the terminal device 250 may determine the one or more delay-related parameters according to the instruction information. Specific content of the determining the one or more delay-related parameters may refer to the content discussed above, which will not be repeated here.

The following describes the situation where the terminal device 250 determines the one or more delay-related parameters according to information stored by itself.

The one or more delay-related parameters between the satellite service link corresponding to the serving cell and the satellite service link corresponding to the neighboring cell are determined according to the location of the gateway station, the pre-stored ephemeris, the satellite identifier corresponding to the serving cell, and the satellite identifier corresponding to the neighboring cell, or according to the location information of the terminal device, the location of the gateway station, the pre-stored ephemeris, the satellite identifier corresponding to the serving cell, and the satellite identifier corresponding to the neighboring cell.

Specifically, the ephemeris is pre-stored in the terminal device 250, and the ephemeris may refer to the content discussed above, which will not be repeated here. The terminal device 250 may determine the satellite identifier corresponding to the serving cell and the satellite identifier corresponding to the neighboring cell, determine the location of the satellite corresponding to the serving cell, and the location of the satellite corresponding to the neighboring cell according to the ephemeris, determine a distance among the gateway station 220, the satellite corresponding to the serving cell, and the terminal device 250, namely a propagation path of the satellite service link corresponding to the serving cell, and determine a distance among the gateway station 220, the satellite corresponding to the neighboring cell, and the terminal device 250, namely a propagation path of the satellite service link corresponding to the neighboring cell, so as to calculate a propagation distance difference and determine the one or more delay-related parameters according to the propagation distance difference.

As an embodiment, the terminal device 250 may determine the satellite identifier of the satellite serving the serving cell according to an identifier of the serving cell, the location of the terminal device, and a current moment. Similarly, the terminal device 250 may determine the satellite identifier of the satellite serving the neighboring cell according to an identifier of the neighboring cell, the location of the terminal device, and the current time.

The one or more delay-related parameters may be the delay offset information discussed above, and the delay offset information may refer to the content discussed above, which will not be repeated here.

In the embodiments of the present disclosure, the terminal device 250 may calculate the delay difference by itself, and the network device 241 does not need to send the instruction information, which relatively reduces signaling interaction.

After receiving the instruction information, the terminal device 250 executes S302 to adjust the measurement window according to the one or more delay-related parameters.

Specifically, the terminal device 250 obtains the one or more measurement gap parameters. Content of the one or more measurement gap parameters may refer to the content discussed in S401 above. After obtaining the one or more measurement gap parameters, the terminal device 250 obtains the measurement window of the neighboring cell. After determining the one or more delay-related parameters, the terminal device 250 adjusts the measurement window according to the one or more delay-related parameters. For different one or more delay-related parameters, manners in which the terminal device 250 adjusts the measurement window are also different, which will be described with examples below.

C1: The one or more delay-related parameters are the public offset information.

The public offset information may or may not include the symbol information. The following is divided into two cases, C1-1 and C1-2, for description.

C1-1: If the one or more delay-related parameters are the public offset information, and the public offset information does not include the symbol information, the terminal device 250 advances the starting time of the measurement window by the maximum delay difference, and prolongs the duration of the measurement window by twice the maximum delay difference.

Specifically, in this case, the terminal device 250 obtains the maximum delay difference between the satellite service link corresponding to the serving cell and the satellite service link corresponding to the neighboring cell, but cannot determine a current real-time delay value between the satellite service link corresponding to the serving cell and the satellite service link corresponding to the neighboring cell. The SSB of the neighboring cell may be advanced relative to a signal of the serving cell by the maximum delay difference, or may be neither advanced nor delayed, or may be delayed by the maximum delay difference. Therefore, the terminal device 250 may advance the starting time of the measurement window by the maximum delay difference, and prolong the duration of the measurement window by twice the maximum delay difference to ensure that the terminal device 250 may measure the SSB of the neighboring cell.

Figure 7:
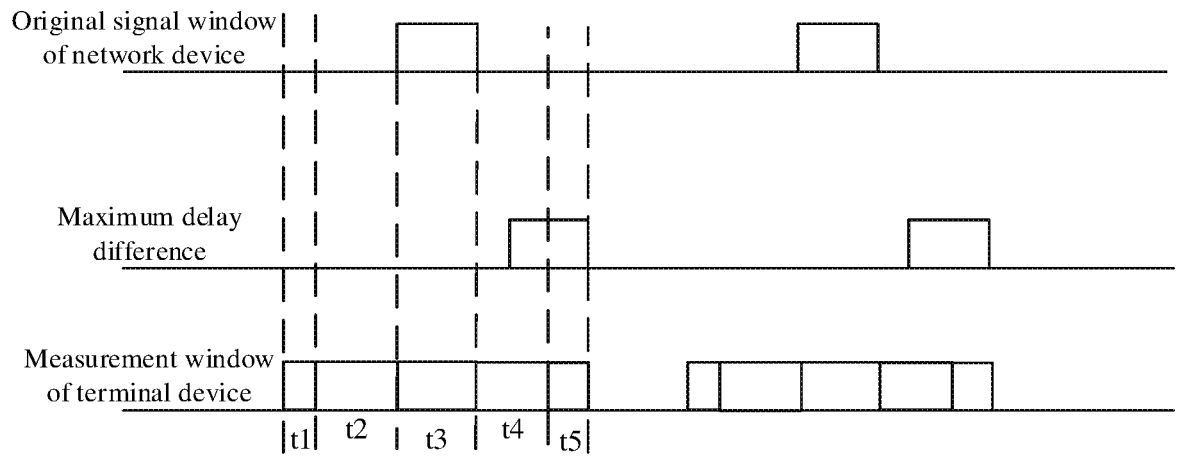
FIG. 7 is a first schematic diagram of adjusting a measurement window by a terminal device provided by an embodiment of the present disclosure.

For example, referring to FIG. 7, the adjusted measurement window of the terminal device 250 includes t1, t2, t3, t4, and t5. t2 and t4 are that the terminal device 250 performs prolonging by twice the maximum delay difference according to the maximum delay difference.

C1-2: If the one or more delay-related parameters are the public offset information, and the public offset information includes symbol information, and if the symbol information is configured to instruct that the maximum delay difference is the timing delay, the duration of the measurement window is prolonged by the maximum delay difference. If the symbol information is configured to instruct that the maximum delay difference is the timing advance, the starting time of the measurement window is advanced by the maximum delay difference, and the duration of the measurement window is prolonged by the maximum delay difference.

Specifically, since the public offset information includes the symbol information, after obtaining the public offset information, the terminal device 250 may determine whether the public offset information is the timing delay or the timing advance according to the symbol information. If the symbol information instructs that the maximum delay difference is the timing delay, the terminal device 250 does not adjust the starting time of the measurement window, but prolongs the duration of the measurement window by the maximum delay difference. If the symbol information instructs that the maximum delay difference is the timing advance, the terminal device 250 advances the starting time of the measurement window by the maximum delay difference, and prolongs the duration of the measurement window by the maximum delay difference.

Figure 8:
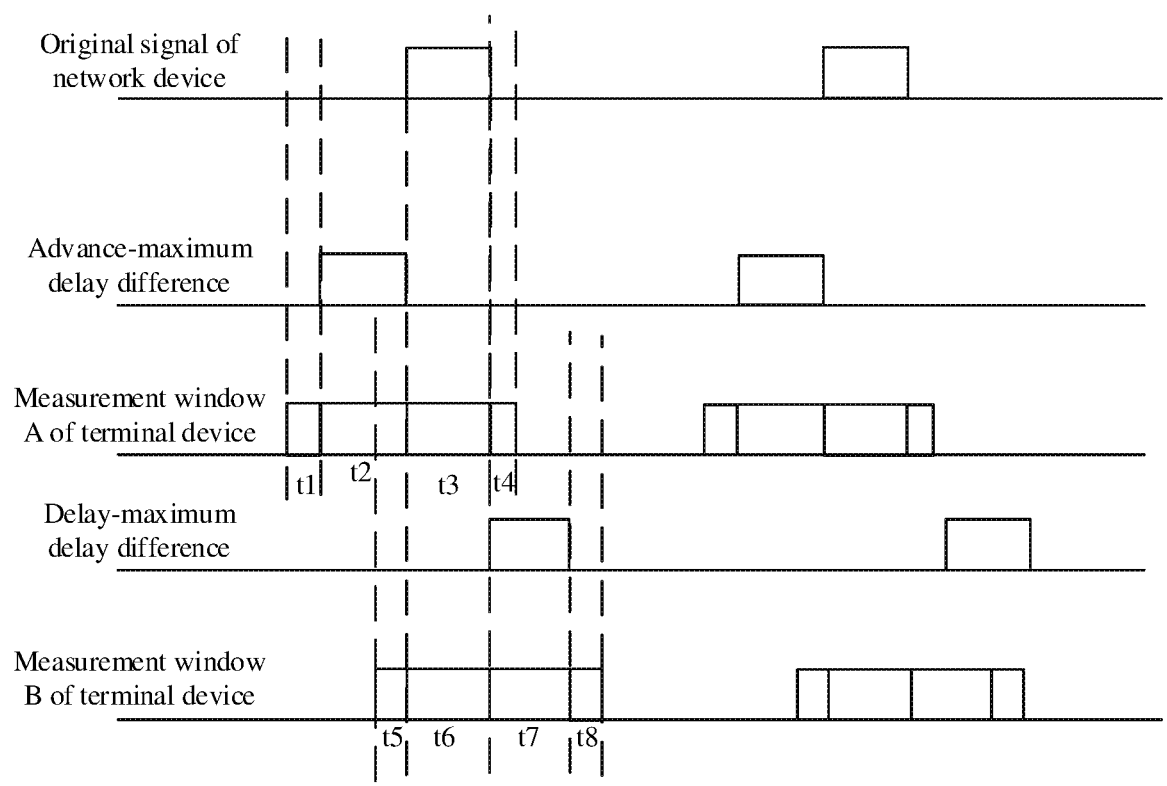
FIG. 8 is a second schematic diagram of adjusting a measurement window by a terminal device provided by an embodiment of the present disclosure.

For example, referring to FIG. 8, the terminal device determines that the symbol information is configured to instruct the maximum delay difference is the timing advance, and the terminal device advances a measurement window A relatively by the maximum delay difference, and prolongs the duration of the measurement window A by the maximum delay difference (as shown by t2 in FIG. 8). If the symbol information is configured to instruct that the maximum delay difference is the timing delay, the terminal device prolongs the duration of the measurement window A by the maximum delay difference (as shown by t8 in FIG. 8).

C2: If the one or more delay-related parameters are the delay offset information, the delay offset information may or may not include the symbol information. The following is divided into two cases, C2-1 and C2-2, for description.

C2-1: If the one or more delay-related parameters are the delay offset information, and the delay offset information does not include the symbol information, the terminal device 250 advances the starting time of the measurement window by the real-time delay difference, and prolongs the duration of the measurement window by twice the real-time delay difference.

C2-2: If the one or more delay-related parameters are the delay offset information, and the delay offset information includes the symbol information, and if the symbol information is configured to instruct that the real-time delay difference is the timing delay, the duration of the measurement window is prolonged by the real-time delay difference. If the symbol information is configured to instruct that the real-time delay difference is the timing advance, the starting time of the measurement window is advanced by the real-time delay difference, and the duration of the measurement window is prolonged by the real-time delay difference.

Specifically, since a distance difference between the terminal device 250 and the gateway station 220 is relatively small, the terminal device 250 may not consider its own location, but directly determine the location of the satellite corresponding to the serving cell in the ephemeris according to the satellite identifier corresponding to the serving cell, and then determine the distance between the satellite corresponding to the serving cell and the gateway station 220 according to the location of the gateway station 220. The terminal device 250 may directly determine the location of the satellite corresponding to the neighboring cell in the ephemeris according to the satellite identifier corresponding to the neighboring cell, and then determine a distance between the satellite corresponding to the neighboring cell and the gateway station 220 according to the location of the gateway station 220, so as to determine the propagation path difference between the satellite service link corresponding to the serving cell and the satellite service link corresponding to the neighboring cell, thereby determining the corresponding delay difference.

In order to determine a more accurate delay difference, when determining the distance between the satellite service link corresponding to the serving cell and the satellite service link corresponding to the neighboring cell, the terminal device 250 may take the location of the terminal device 250 into consideration to calculate a first distance among the terminal device 250, the satellite of the serving cell, and the gateway station 220. Similarly, the terminal device 250 calculates a second distance among the gateway station 220, the satellite of the neighboring cell, and the terminal device 250, and determines the propagation path difference between the satellite service link corresponding to the serving cell and the satellite service link corresponding to the neighboring cell according to the first distance and the second distance, so as to determine the delay difference.

As an embodiment, the location of the gateway station 220 includes locations of a plurality of gateway stations 220, but the terminal device 250 is not sure which gateway station 220 corresponds to the satellite corresponding to the serving cell or the satellite corresponding to the neighboring cell. Thus, the terminal device 250 may determine a gateway station 220 closest to the satellite corresponding to the serving cell as the gateway station 220 corresponding to the satellite corresponding to the serving cell, and determine a gateway station 220 closest to the satellite corresponding to the neighboring cell as the gateway station 220 corresponding to the satellite corresponding to the neighboring cell.

As an embodiment, the ephemeris may be updated, which may or may not be periodic. After the ephemeris is updated, the first network device 241 may send an updated ephemeris to the terminal device 250. The terminal device 250 calculates the delay difference according to the received latest ephemeris.

There are a plurality of manners for the first network device 241 to send the updated ephemeris, for example, through dedicated signaling, or through system information broadcasting, which is not specifically limited here.

In the embodiments of the present disclosure, the terminal device 250 calculates the delay difference according to the location information and the like. Since the calculation is based on real-time location information, the terminal device 250 may determine that the obtained delay difference is the timing advance or the timing delay.

After the terminal device 250 determines the delay difference, if the delay difference is the timing delay, the terminal device 250 prolongs the duration of the measurement window by the delay difference. If the symbol information is configured to instruct that the delay difference is the timing advance, the starting time of the measurement window is advanced by the real-time delay difference, and the duration of the measurement window is prolonged by the delay difference.

C3: If the one or more delay-related parameters are the combination of one or two of the delay offset information and the public offset information, the terminal device 250 may adjust the measurement window of the terminal device 250 with any one of the information as a reference, or the terminal device 250 presets priorities of the delay offset information and the public offset information, and adjusts the measurement window with the information with a higher priority as a reference.

Specifically, the terminal device 250 presets the priorities of the delay offset information and the public offset information. If the terminal device 250 receives the information with the higher priority, the terminal device 250 adjusts the measurement window with the information as a reference. If no information about a neighboring cell with a highest priority is received, information with a second highest priority is used as a reference, and so on.

Since the delay between the satellite service link corresponding to the serving cell and the satellite service link corresponding to the neighboring cell may continuously change, the first network device 241 may continuously update the instruction information and send updated indication information to the terminal device 250. The process of updating the instruction information by the first network device 241 will be described below.

D1: updating process 1.

Figure 9:
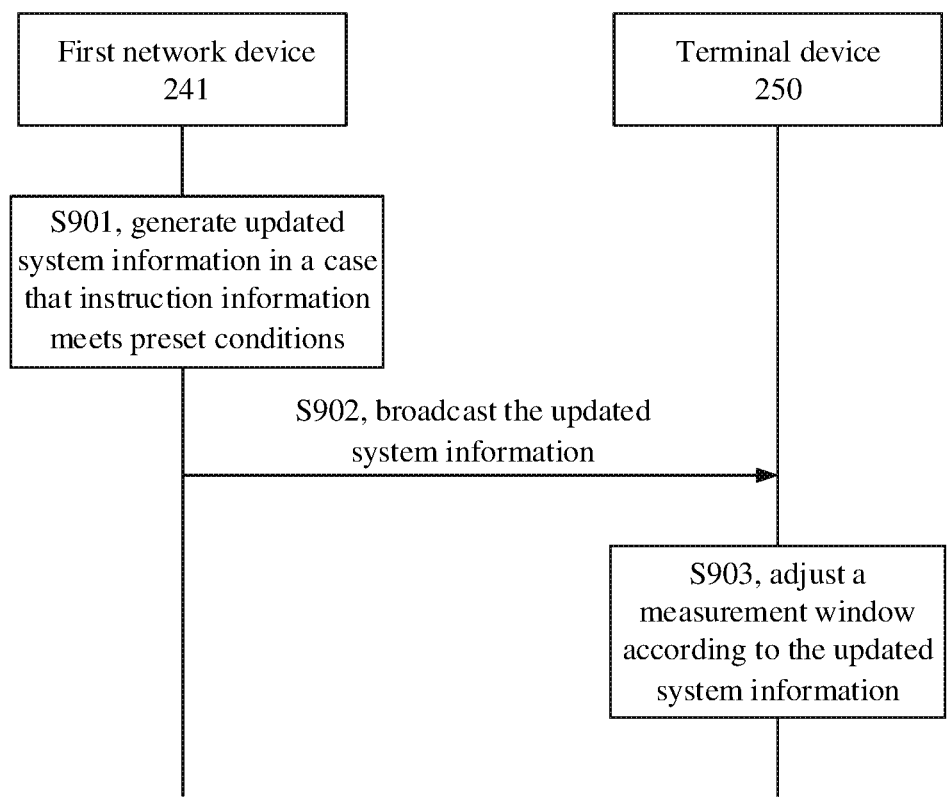
FIG. 9 is a first schematic diagram of a process of updating indication information provided by an embodiment of the present disclosure.

As shown in FIG. 9, in the embodiments of the present disclosure, the updating process includes S901, S902 and S903.

S901: when determining that the instruction information meets a preset condition, the first network device 241 generates updated system information.

S902: the first network device 241 broadcasts the updated system information.

S903: the terminal device 250 adjusts the measurement window according to the updated system information.

In the embodiments of the present disclosure, after the first network device 241 sends the instruction information through the system information, the first network device 241 updates the system information when determining that the instruction information meets the preset condition, and broadcasts the updated system information, and the terminal device 250 adjusts the measurement window according to the updated system information.

The preset condition in S901 is, for example, the following preset condition 1 and/or preset condition 2.

Preset condition 1: It is determined that the symbol information in the instruction information needs to be updated.

In S901, in the case that the instruction information is the public offset information, the public offset information includes the symbol information. In the case that the first network device 241 determines that the symbol information needs to be updated, the first network device 241 may trigger generation of the updated system information. The updated system information carries the updated symbol information. The updating means that the symbol information may be updated from instructing the timing advance to instructing the timing delay, or may be updated from instructing the timing delay to instructing the timing advance.

Preset condition 2: It is determined that a difference between a current delay difference and a previous delay difference in the instruction information is greater than a preset threshold.

Specifically, the instruction information is the real-time delay difference, and the real-time delay difference may continuously change. When the first network device 241 determines that the difference between the current delay difference in a current time period and the delay difference in the instruction information is greater than the preset threshold, the first network device 241 may trigger updating of the system information, and the updated system information carries the current delay difference.

After the first network device 241 triggers the updating of the system information, the first network device 241 notifies the terminal device 250 that the system information needs to be updated in a paging process. Then, S902 is executed, that is, the updated system information is broadcast.

Specifically, since different neighboring cells may have different delay differences or symbol information from the serving cell, the first network device 241 may broadcast updated system information corresponding to each neighboring cell according to frequency points, so as to facilitate the terminal device 250 to determine a cell to which the updated instruction information belongs.

The first network device 241 broadcasts the updated system information. After receiving the broadcast updated system information, the terminal device 250 executes S903: adjusting the measurement window according to the updated system information.

Specifically, the updated system information carries the updated instruction information, and the terminal device 250 adjusts the measurement window according to the updated instruction information. An adjusting manner may refer to the content discussed above, which will not be repeated here.

A periodicity at which the first network device 241 broadcasts the updated system information is generally relatively fixed. If the updated system information is broadcast after the broadcast periodicity is reached, the terminal device 250 may not be able to receive the updated instruction information in time. Therefore, in the embodiment of the present disclosure, when the first network device 241 determines that the preset condition 1 is met, the first network device 241 may send downlink control information (DCI) to the terminal device 250 through a paging process. The DCI is configured to instruct the terminal device 250 to update the symbol information.

Specifically, the first network device 241 may instruct in time the terminal device 250 to update the symbol information according to the DCI. After the terminal device 250 receives the DCI, the first network device 241 updates the symbol information in the instruction information according to an instruction of the DCI, and then adjusts the measurement window according to the updated symbol information.

D2: updating process 2.

Figure 10:
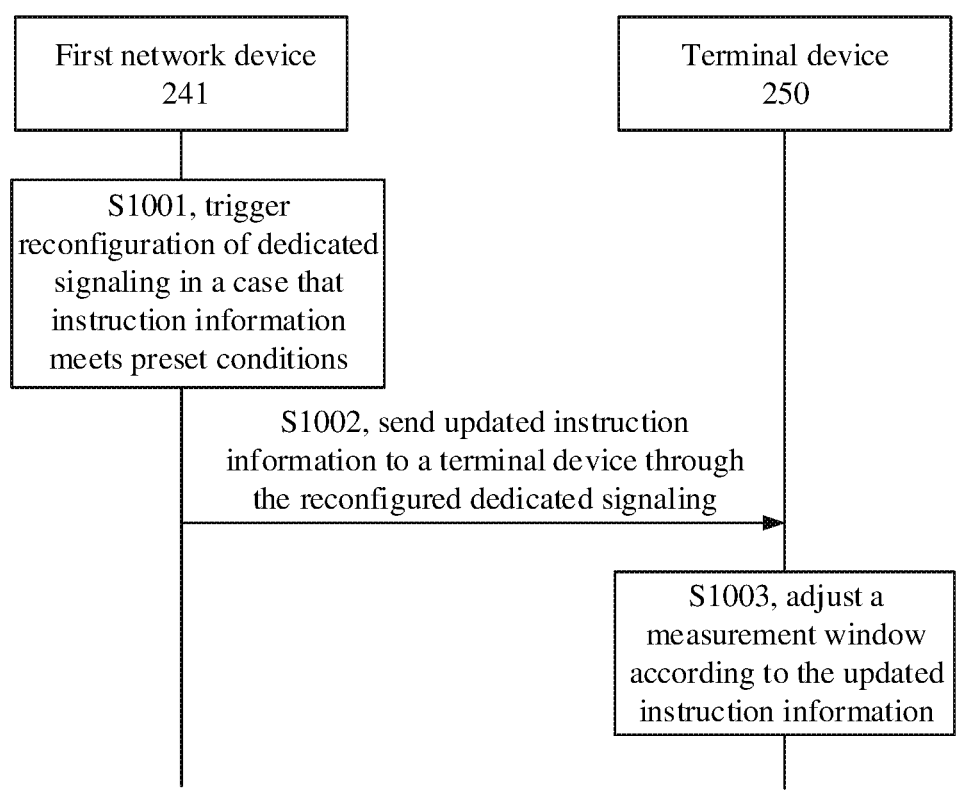
FIG. 10 is a second schematic diagram of a process of updating indication information provided by an embodiment of the present disclosure.

As shown in FIG. 10, the updating process includes S1001, S1002 and S1003.

S1001, in a case that the first network device 241 determines that the instruction information meets a preset condition, the first network device 241 triggers reconfiguration of dedicated signaling.

S1002, the first network device 241 sends updated instruction information to the terminal device 250 through the reconfigured dedicated signaling.

S1003: the terminal device 250 adjusts the measurement window according to the updated instruction information.

In S1001, the preset condition may refer to the content discussed in FIG. 9, which will not be repeated here. When the first network device 241 determines that the preset condition is met, the first network device 241 triggers the reconfiguration of the dedicated signaling. The first network device 241 determines the updated instruction information according to the preset condition.

The first network device 241 executes S1002: sending the updated instruction information to the terminal device 250 through the reconfigured dedicated signaling.

Specifically, when the preset condition is the preset condition 1 discussed above, the first network device 241 carries the updated symbol information in the dedicated signaling. When the preset condition is the preset condition 2 discussed above, the first network device 241 carries the current delay difference in the dedicated signaling. The updated instruction information is sent to the terminal device 250 through the dedicated signaling.

Further, since different neighboring cells may have different delay differences or symbol information from the serving cell, the first network device 241 may send the updated system information corresponding to each neighboring cell through the dedicated signaling according to the frequency points, so the terminal device 250 may determine a cell to which the updated indication information belongs.

After receiving the updated instruction information, the terminal device 250 executes S1003: adjusting the measurement window according to the updated instruction information.

After adjusting the measurement window, or adjusting the measurement window according to the updated instruction information, the terminal device 250 executes S303: measuring the synchronization signal block of the neighboring cell according to the adjusted measurement window.

Specifically, after the terminal device 250 adjusts the measurement window, i.e., determining a time domain location of the neighboring cell to send the SSB, the terminal device 250 measures the synchronization signal block of the neighboring cell according to the adjusted measurement window. The synchronization signal block of the neighboring cell is periodically broadcast by the second network device 242 corresponding to the neighboring cell. Since the terminal device 250 compensates for delays of different satellite service links, it may be ensured that the terminal device 250 may obtain the SSB according to the adjusted measurement window, and complete a process of measurement synchronization with the neighboring cell. The second network device 242 and the first network device 241 may be different network devices or the same network device.

In a possible embodiment, in order to improve a success rate of the terminal device 250 in measuring the SSB of the neighboring cell, the terminal device 250 may adjust its own antenna angle before measuring the synchronization signal block of the neighboring cell.

Specifically, the terminal device 250 may determine an included angle between its own antenna and the satellite of the neighboring cell according to the pre-stored ephemeris, the satellite identifier corresponding to the serving cell, the satellite identifier corresponding to the neighboring cell, and the location of the terminal device 250 itself.

After the included angle is determined, the antenna of the terminal device 250 is adjusted to a direction aligned with the satellite of the neighboring cell, so as to improve the success rate of the terminal device 250 in measuring the SSB of the neighboring cell.

Figure 11:
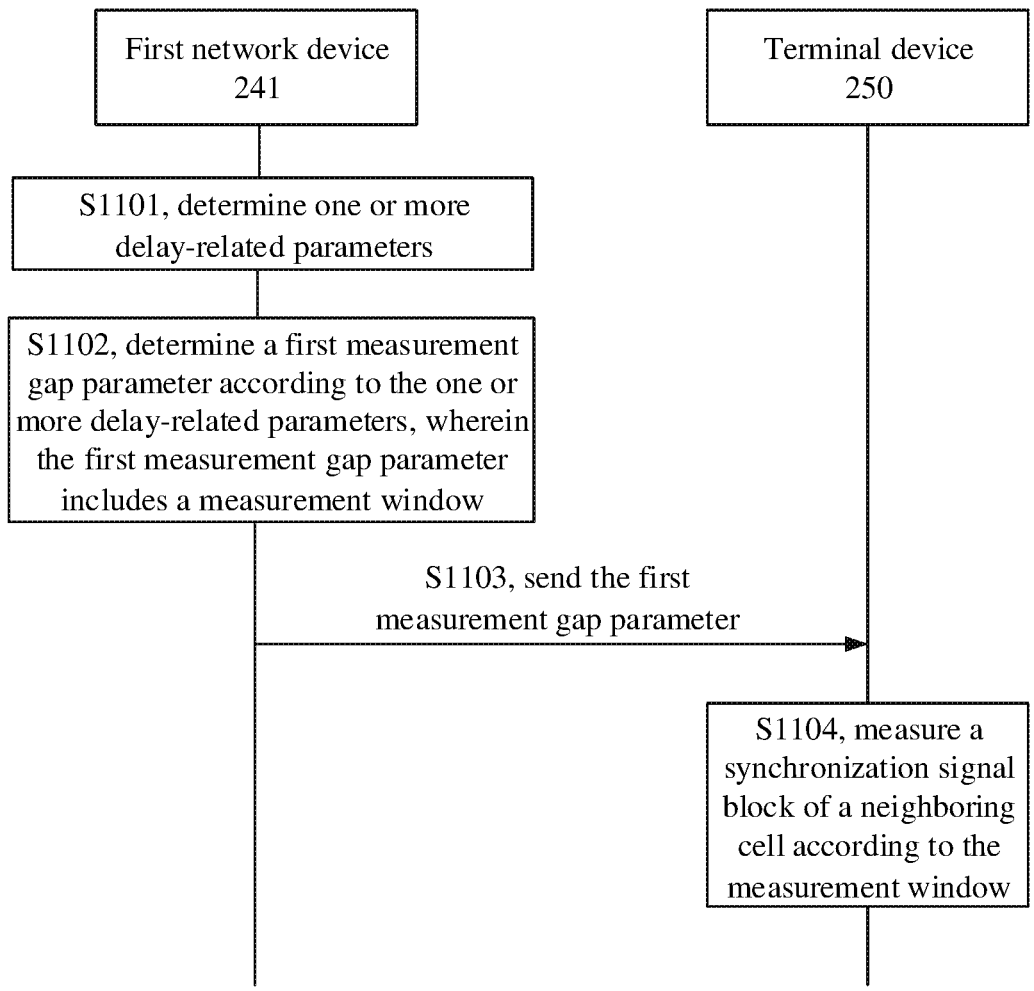
FIG. 11 is a second schematic flowchart of a second method for measurement synchronization provided by an embodiment of the present disclosure.

In order to solve the same technical problem, based on the application scenario discussed in FIG. 2, an embodiment of the present disclosure further provides a second method for measurement synchronization. As shown in FIG. 11, the method includes S1101, S1102, S1103 and S1104.

S1101, a first network device 241 determines one or more delay-related parameters.

S1102, a first measurement gap parameter is determined according to the one or more delay-related parameters. The measurement gap parameter includes a measurement window.

S1103, the first measurement gap parameter is sent to a terminal device 250.

S1104, a synchronization signal block of a neighboring cell is measured according to the measurement window.

In the embodiments of the present disclosure, the first network device 241 determines the one or more delay-related parameters between a satellite service link corresponding to a serving cell and a satellite service link corresponding to the neighboring cell in advance, determines the first measurement gap parameter associated with the one or more delay-related parameters, and sends the first measurement gap parameter to the terminal device 250. That is, in the embodiments of the present disclosure, when the first network device 241 determines the first measurement gap parameter, the first network device 241 takes a delay difference between the satellite service link corresponding to the serving cell and the satellite service link corresponding to the neighboring cell into consideration. Therefore, synchronization between the first measurement gap parameter obtained by the terminal device and the SSB of the neighboring cell is improved, thereby improving the reliability of measurement synchronization in a satellite system.

After introducing the overall conception of the method for measurement synchronization in the embodiment of the present disclosure, each step in the embodiment of the present disclosure will be described in detail below.

S1101, the first network device 241 determines the one or more delay-related parameters.

The one or more delay-related parameters refer to one or more delay-related parameters between the satellite service link corresponding to the serving cell and the satellite service link corresponding to the neighboring cell, and include public offset information and/or delay offset information. The public offset information includes a maximum delay difference between the satellite service link corresponding to the serving cell and the satellite service link corresponding to the neighboring cell. The delay offset information includes a real-time delay difference between the satellite service link corresponding to the serving cell and the satellite service link corresponding to the neighboring cell.

In a possible embodiment, the public offset information includes symbol information, and the symbol information is configured to instruct that the maximum delay difference is a timing advance or a timing delay.

In a possible embodiment, the delay offset information includes symbol information, and the symbol information is configured to instruct that the real-time delay difference is a timing advance or a timing delay.

In S1101, there are a plurality of manners for the first network device 241 to determine the one or more delay-related parameters, which will be described below with examples.

D1: A propagation distance difference between the satellite service link corresponding to the serving cell and the satellite service link corresponding to the neighboring cell is determined according to a location of a gateway station, a pre-stored ephemeris, a satellite identifier corresponding to the serving cell, and a satellite identifier corresponding to the neighboring cell; and the one or more delay-related parameters of the satellite service link corresponding to the serving cell and the satellite service link corresponding to the neighboring cell are determined according to the propagation distance difference.

Specifically, a location of a satellite corresponding to the serving cell may be determined according to the ephemeris and the satellite identifier corresponding to the serving cell. A location of a satellite corresponding to the neighboring cell may be determined according to the ephemeris and the satellite identifier corresponding to the neighboring cell. The propagation distance difference between the satellite service link corresponding to the serving cell and the satellite service link corresponding to the neighboring cell is determined according to the location of the gateway station, the location of the satellite corresponding to the serving cell, and the location of the satellite corresponding to the neighboring cell, which may refer to the content discussed in C3 and will not be repeated here.

D2: The propagation distance difference between the satellite service link corresponding to the serving cell and the satellite service link corresponding to the neighboring cell is determined according to a location of the terminal device 250, the pre-stored ephemeris, the location of the gateway station, the satellite identifier corresponding to the serving cell, and the satellite identifier corresponding to the neighboring cell; and the one or more delay-related parameters of the satellite service link corresponding to the serving cell and the satellite service link corresponding to the neighboring cell are determined according to the propagation distance difference.

As discussed above, no matter which manner is adopted to calculate the one or more delay-related parameters, the ephemeris may be updated periodically or non-periodically. After the ephemeris is updated, the first network device 241 may calculate the one or more delay-related parameters according to a latest ephemeris to ensure the accuracy of the calculated one or more delay-related parameters.

In the embodiment of the present disclosure, when the one or more delay-related parameters are determined, the location of the terminal device 250 is taken into consideration, so more accurate one or more delay-related parameters may be obtained, and the reliability of measurement synchronization is further improved.

S1102, the first measurement gap parameter is determined according to the one or more delay-related parameters. The measurement gap parameter includes the measurement window.

Specifically, the first network device 241 may configure measurement windows corresponding to non-interfering SSBs for each neighboring cell in advance. After obtaining one or more delay-related parameters of a certain neighboring cell, the first network device 241 may adjust a measurement window of an SSB of the neighboring cell according to the one or more delay-related parameters, and determine a first measurement gap parameter corresponding to the neighboring cell. For different one or more delay-related parameters, manners in which the first network device determines the first measurement gap parameter are also different, which will be described with examples below.

K1: The one or more delay-related parameters are the public offset information.

After the first network device 241 determines the public offset information, and when the public offset information does not include the symbol information, the first network device 241 may increase an originally configured measurement window by twice the maximum delay difference, and advance the originally configured measurement window by the maximum delay difference.

After the first network device 241 determines the public offset information, and when the public offset information includes the symbol information, if the symbol information is configured to instruct that the maximum delay difference is the timing delay, the duration of the measurement window is prolonged by the maximum delay difference, and if the symbol information is configured to instruct that the maximum delay difference is the timing advance, a starting time of the originally configured measurement window is advanced by the maximum delay difference, and duration of the originally configured measurement window is prolonged by the maximum delay difference.

K2: The one or more delay-related parameters are the delay offset information.

After the first network device 241 determines the delay offset information, and when the delay offset information does not include the symbol information, the first network device 241 may increase the originally configured measurement window by twice the real-time delay difference, and advance the originally configured measurement window by the real-time delay difference.

After the first network device 241 determines the delay offset information, and when the delay offset information includes the symbol information, if the symbol information is configured to instruct that the real-time delay difference is the timing delay, the duration of the measurement window is prolonged by the real-time delay difference, and if the symbol information is configured to instruct that the real-time delay difference is the timing advance, the starting time of the originally configured measurement window is advanced by the real-time delay difference, and the duration of the originally configured measurement window is prolonged by the real-time delay difference.

K3: The one or more delay-related parameters include the public offset information and the delay offset information.

The first network device 241 may adjust the originally configured measurement window according to any one of the information in the one or more delay-related parameters. Specific adjusting manners may refer to K1 and K2 discussed above.

After adjusting the originally configured measurement window, an adjusted measurement window is obtained, and then the first measurement gap parameter is obtained.

After obtaining the first measurement gap parameter, the first network device 241 executes S1103: sending the first measurement gap parameter to the terminal device 250.

Specifically, the first network device 241 may send the first measurement gap parameter to the terminal device 250 through broadcast system information. The first network device 241 may also send the first measurement gap parameter to the terminal device 250 through dedicated signaling. The dedicated signaling may refer to the content discussed above, which will not be repeated here.

Since the location of the satellite corresponding to the serving cell and the location of the satellite corresponding to the neighboring cell may continuously change, and the distance between the satellite service link corresponding to the serving cell and the satellite service link corresponding to the neighboring cell may continuously change, the delay difference between the satellite service link corresponding to the serving cell and the satellite service link corresponding to the neighboring cell may also continuously change. Therefore, in the embodiment of the present disclosure, the first network device 241 may update the first measurement gap parameter.

Figure 12:
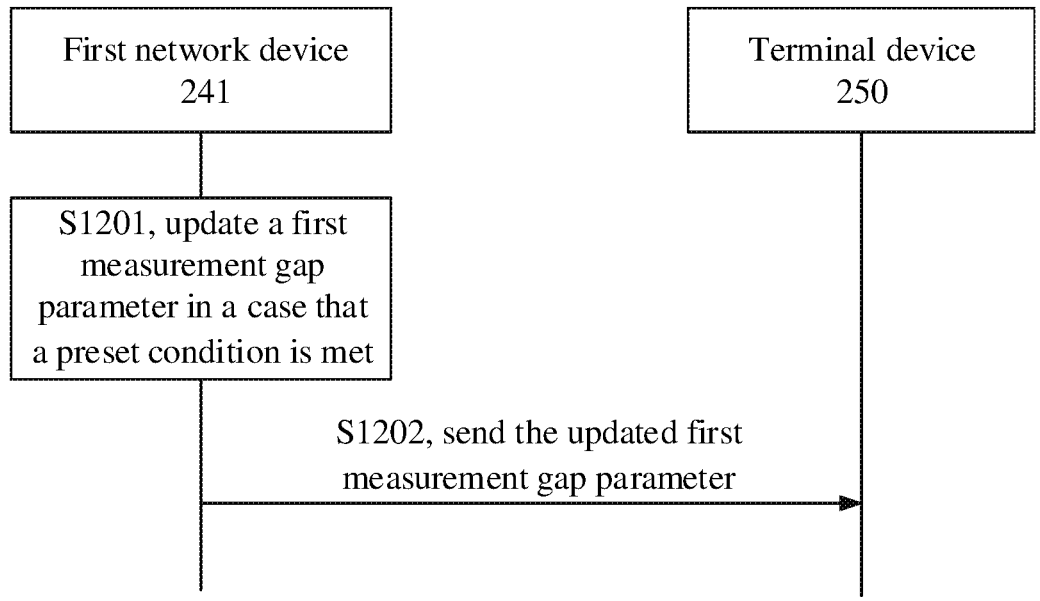
FIG. 12 is a schematic diagram of updating one or more measurement gap parameters provided by an embodiment of the present disclosure.

As shown in FIG. 12, updating the first measurement gap parameter includes S1201 and S1202.

S1201: the first network device 241 determines that the one or more delay-related parameters meet a preset condition, and updates the first measurement gap parameter.

S1202: the first network device 241 sends an updated first measurement gap parameter to the terminal device 250.

In the embodiments of the present disclosure, the first network device 241 updates the first measurement gap parameter when the one or more delay-related parameters meet the preset condition, so that the updated measurement gap parameter better matches current one or more delay-related parameters, which further improves the reliability of measurement synchronization of the terminal device 250.

The following is examples to describe the preset condition in S1201.

A first preset condition: The first network device 241 determines that the symbol information in the one or more delay-related parameters needs to be updated.

Specifically, the symbol information in the one or more delay-related parameters needing to be updated includes two cases: the symbol information in the public offset information needs to be updated, or the symbol information in the delay offset information needs to be updated. The first network device 241 may generate a second measurement gap parameter according to updated symbol information.

A second preset condition: The first network device 241 determines that a difference between a current delay difference and the delay difference of the one or more delay-related parameters is greater than a preset threshold.

Specifically, the one or more delay-related parameters include the delay offset information. Since the real-time delay difference in the delay offset information may continuously change, but the first network device 241 further needs to process other services, when the difference between the current delay difference and the previous delay difference is greater than the preset threshold, the first network device 241 determines that the first measurement gap parameter needs to be updated. The first network device 241 may generate a third measurement gap parameter according to the current delay difference.

A third preset condition: It is determined that a preset time gap is met.

Specifically, the first network device 241 periodically updates the one or more measurement gap parameters. If it is determined that the preset time gap has been reached since the last time the first measurement gap parameter was sent, the first network device 241 determines that the first measurement gap parameter needs to be updated. The first network device 241 may update the first measurement gap parameter according to currently corresponding one or more delay-related parameters.

When the first network device 241 determines that any one of the preset conditions is met, it may generate a fourth measurement gap parameter according to content that needs to be updated correspondingly in the preset condition.

After the first measurement gap parameter is updated, the first network device 241 executes S1202: sending the updated measurement gap parameter to the terminal device 250.

Specifically, there are a plurality of manners for the first network device 241 to specifically send the updated measurement gap parameter, which will be described below with examples.

Sending manner 1: A message of updating system information is sent to the terminal device 250 through a paging process, and system information including the updated measurement gap parameter is broadcast.

Specifically, the first network device 241 may trigger updating of the system information when the preset condition is met, carry the updated measurement gap parameter in the system information, and send the system information to the terminal device 250. The updated measurement gap parameter is, for example, the second measurement gap parameter, the third measurement gap parameter, or the fourth measurement gap parameter discussed above.

Sending manner 2: DCI is sent through a paging process so as to send the updated measurement gap parameter to the terminal device 250.

Specifically, the first network device 241 may send the DCI in the paging process, and send the DCI carrying the updated measurement gap parameter to the terminal device 250. The updated measurement gap parameter is, for example, the second measurement gap parameter, the third measurement gap parameter, or the fourth measurement gap parameter discussed above.

Sending manner 3: The updated measurement gap parameter is sent to the terminal device 250 through a paging message scheduled by the DCI in the paging process.

Specifically, the updated measurement gap parameter is carried in the paging message. The updated measurement gap parameter is, for example, the second measurement gap parameter, the third measurement gap parameter, or the fourth measurement gap parameter discussed above.

Sending manner 4: The updated measurement gap parameter is sent to the terminal device 250 through reconfigured dedicated signaling.

Specifically, the first network device 241 carries the updated measurement gap parameter in the dedicated signaling, and sends the updated measurement gap parameter to the terminal device 250.

After the updated measurement gap parameter is sent, the terminal device 250 may receive the updated measurement gap parameter in a corresponding receiving manner.

After receiving the first measurement gap parameter or the updated measurement gap parameter, the terminal device 250 executes S1204: measuring the synchronization signal block of the neighboring cell according to the measurement window.

Specifically, after receiving the first measurement gap parameter or the updated measurement gap parameter, the terminal device 250 may measure the synchronization signal block of the neighboring cell on a corresponding measurement window according to the measurement window in the corresponding measurement gap parameter, so as to complete downlink synchronization with the neighboring cell.

In a possible embodiment, in order to improve the success rate of the terminal device 250 in measuring the SSB of the neighboring cell, the terminal device 250 may adjust its own antenna angle before measuring the synchronization signal block of the neighboring cell.

Specifically, the terminal device 250 may determine the included angle between its own antenna and the satellite of the neighboring cell according to the pre-stored ephemeris, the satellite identifier corresponding to the serving cell, the satellite identifier corresponding to the neighboring cell, and the location of the terminal device 250 itself. After determining the included angle, the antenna of the terminal device 250 is adjusted to the direction aligned with the satellite of the neighboring cell, so as to improve the success rate of the terminal device 250 in measuring the SSB of the neighboring cell.

Figure 13:
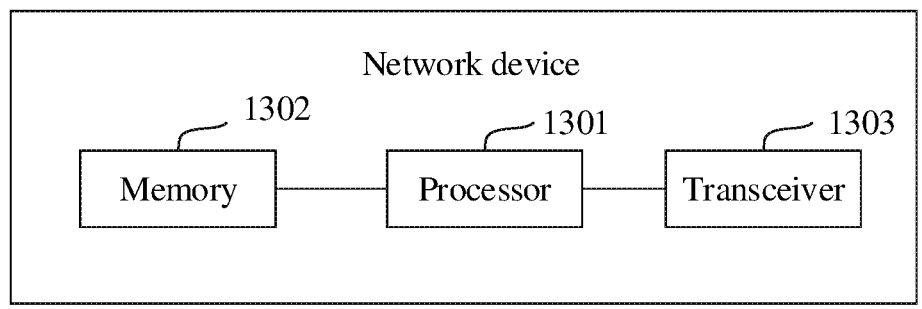
FIG. 13 is a first schematic structural diagram of a network device provided by an embodiment of the present disclosure.

On the basis of the first method for measurement synchronization, an embodiment of the present disclosure further provides a network device. As shown in FIG. 13, the network device includes: a processor 1301, a memory 1302, and a transceiver 1303.

The processor 1301 is configured to read one or more programs in the memory 1302 and execute the following processes: configuring one or more measurement gap parameters for a terminal device 250, where the one or more measurement gap parameters include a measurement window; and sending instruction information to the terminal device 250 so that the terminal device 250 adjusts the measurement window according to the instruction information, and measure a synchronization signal block of a neighboring cell according to the adjusted measurement window. The instruction information is configured to instruct one or more delay-related parameters of a satellite service link corresponding to a serving cell and a satellite service link corresponding to the neighboring cell.

In a possible embodiment, the processor 1301 is further configured to: send the instruction information to the terminal device through broadcast system information; or send the instruction information to the terminal device through dedicated signaling.

In a possible embodiment, the instruction information includes one or more of public offset information, delay offset information, or location information. The public offset information includes a maximum delay difference between the satellite service link corresponding to the serving cell and the satellite service link corresponding to the neighboring cell. The delay offset information includes a real-time delay difference between the satellite service link corresponding to the serving cell and the satellite service link corresponding to the neighboring cell. The location information includes a satellite identifier corresponding to the serving cell and a satellite identifier corresponding to the neighboring cell, or the location information includes a location of a gateway station, the satellite identifier corresponding to the serving cell and the satellite identifier corresponding to the neighboring cell.

In a possible embodiment, the public offset information further includes symbol information, and the symbol information is configured to instruct that the maximum delay difference is a timing advance or a timing delay. The processor 1301 is further configured to: in a case that the symbol information needs to be updated, notify the terminal device to update the symbol information in the following manner: sending a message of updating system information to the terminal device through a paging process, and broadcasting system information including updated symbol information; or sending downlink control information DCI to the terminal device through a paging process. The DCI is configured to instruct the terminal device to update the symbol information.

In a possible embodiment, the instruction information is the delay offset information, and the processor 1301 is further configured to: after the instruction information is sent to the terminal device, for a neighboring cell at any frequency point, in a case that a difference between a current delay difference and the delay difference in the instruction information is greater than a preset threshold, broadcast system information including the current delay difference, or send instruction information including the current delay difference to the terminal device through reconfigured dedicated signaling. The current delay difference refers to a delay difference between the satellite service link corresponding to the serving cell and the satellite service link corresponding to the neighboring cell in a current time period.

It should be noted that the processor 1301 and the memory 1302 may be relatively independently disposed, or may be coupled. FIG. 13 takes one processor 1301 as an example, but in fact, the quantity of processors 1301 is not limited.

Figure 14:
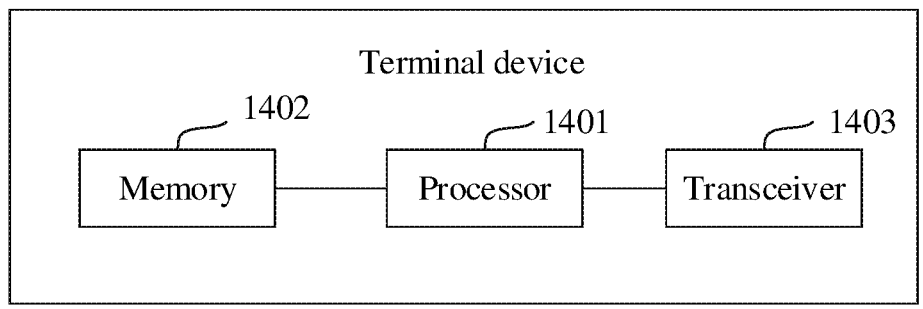
FIG. 14 is a first schematic structural diagram of a terminal device provided by an embodiment of the present disclosure.

On the basis of the first method for measurement synchronization, an embodiment of the present disclosure further provides a terminal device. As shown in FIG. 14, the terminal device includes: a processor 1401, a memory 1402, and a transceiver 1403.

The processor 1401 is configured to read one or more programs in the memory 1402 and execute the following processes: obtaining one or more measurement gap parameters configured by a network device, where the one or more measurement gap parameters include a measurement window; determining one or more delay-related parameters, where the one or more delay-related parameters are configured to represent a delay between a satellite service link corresponding to a serving cell and a satellite service link corresponding to a neighboring cell; adjusting the measurement window according to the one or more delay-related parameters, where the measurement window is obtained from the one or more measurement gap parameters configured by the network device; and measuring a synchronization signal block corresponding to the neighboring cell according to the adjusted measurement window.

In a possible embodiment, the processor 1401 is further configured to: before the determining the one or more delay-related parameters, receive instruction information through broadcast system information; or receive the instruction information through dedicated signaling sent by the network device. The instruction information is configured to instruct the one or more delay-related parameters.

In a possible embodiment, the instruction information includes one or more of public offset information, delay offset information, or location information. The public offset information includes a maximum delay difference between the satellite service link corresponding to the serving cell and the satellite service link corresponding to the neighboring cell. The delay offset information includes a real-time delay difference between the satellite service link corresponding to the serving cell and the satellite service link corresponding to the neighboring cell. The location information includes a satellite identifier corresponding to the serving cell and a satellite identifier corresponding to the neighboring cell, or the location information includes a location of a gateway station, the satellite identifier corresponding to the serving cell and the satellite identifier corresponding to the neighboring cell.

In a possible embodiment, the public offset information further includes symbol information, and the symbol information is configured to instruct that the maximum delay difference is a timing advance or a timing delay. The processor 1401 is further configured to: receive a message of updating system information sent through a paging process, and receive updated symbol information or an updated current delay difference for a neighboring cell at a specific frequency point through broadcast updated system information, where the current delay difference refers to a delay difference between the satellite service link corresponding to the serving cell and the satellite service link corresponding to the neighboring cell in a current time period; or receive instruction information including the updated current delay difference for the neighboring cell at the specific frequency point through reconfigured dedicated signaling; or receive DCI sent by the network device through a paging process, and update the symbol information according to an instruction of the DCL.

In a possible embodiment, the instruction information is the location information, and the processor 1401 is specifically configured to: determine the one or more delay-related parameters of the satellite service link corresponding to the serving cell and the satellite service link corresponding to the neighboring cell according to the location of the gateway station, a pre-stored ephemeris, the satellite identifier corresponding to the serving cell, and the satellite identifier corresponding to the neighboring cell, or according to location information of the terminal device, the location of the gateway station, the pre-stored ephemeris, the satellite identifier corresponding to the serving cell, and the satellite identifier corresponding to the neighboring cell.

In a possible embodiment, the processor 1401 is further configured to: before the measuring the synchronization signal block corresponding to the neighboring cell according to the adjusted measurement window, determine an included angle between an antenna of the terminal device and a satellite corresponding to the neighboring cell according to the pre-stored ephemeris, the satellite identifier corresponding to the serving cell, and the satellite identifier corresponding to the neighboring cell; and adjust the antenna of the terminal device to a direction aligned with the satellite corresponding to the neighboring cell according to the included angle.

In a possible embodiment, the processor 1401 is further configured to: in a case that the public offset information does not include the symbol information, advance a starting time of the measurement window by the maximum delay difference, and prolong duration of the measurement window by twice the maximum delay difference; in a case that the public offset information includes the symbol information, and the symbol information is configured to instruct that the maximum delay difference is the timing delay, prolong the duration of the measurement window by the maximum delay difference; and if the public offset information includes the symbol information, and the symbol information is configured to instruct that the maximum delay difference is the timing advance, advance the starting time of the measurement window by the maximum delay difference, and prolong the duration of the measurement window by the maximum delay difference.

It should be noted that the processor 1401 and the memory 1402 may be relatively independently disposed, or may be coupled. FIG. 14 takes one processor 1401 as an example, but in fact, the quantity of processors 1401 is not limited.

Figure 15:
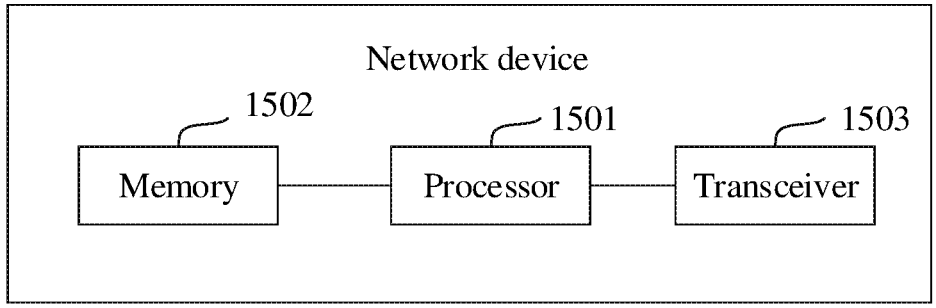
FIG. 15 is a second schematic structural diagram of a network device provided by an embodiment of the present disclosure.

On the basis of the second method for measurement synchronization, an embodiment of the present disclosure further provides a network device. As shown in FIG. 15, the network device includes: a processor 1501, a memory 1502, and a transceiver 1503.

The processor 1501 is configured to read one or more programs in the memory 1502 and execute the following process: determining one or more delay-related parameters of a satellite service link corresponding to a serving cell and a satellite service link corresponding to a neighboring cell; determining a first measurement gap parameter according to the one or more delay-related parameters, where the measurement gap parameter includes a measurement window; and sending the first measurement gap parameter to a terminal device.

In a possible embodiment, the processor 1501 is specifically configured to: determine a propagation distance difference between the satellite service link corresponding to the serving cell and the satellite service link corresponding to the neighboring cell according to a location of a gateway station, a pre-stored ephemeris, a satellite identifier corresponding to the serving cell, and a satellite identifier corresponding to the neighboring cell; or determine the propagation distance difference between the satellite service link corresponding to the serving cell and the satellite service link corresponding to the neighboring cell according to a location of the terminal device, the pre-stored ephemeris, the location of the gateway station, the satellite identifier corresponding to the serving cell, and the satellite identifier corresponding to the neighboring cell; and determine the one or more delay-related parameters of the satellite service link corresponding to the serving cell and the satellite service link corresponding to the neighboring cell according to the propagation distance difference.

In a possible embodiment, the processor 1501 is further configured to: send the first measurement gap parameter to the terminal device through broadcast system information; or send the first measurement gap parameter to the terminal device through dedicated signaling.

In a possible embodiment, the one or more delay-related parameters include public offset information and/or delay offset information. The public offset information includes a maximum delay difference between the satellite service link corresponding to the serving cell and the satellite service link corresponding to the neighboring cell. The delay offset information includes a real-time delay difference between the satellite service link corresponding to the serving cell and the satellite service link corresponding to the neighboring cell.

In a possible embodiment, the public offset information further includes symbol information, and the symbol information is configured to instruct that the maximum delay difference is a timing advance or a timing delay. The processor 1501 is further configured to: after the sending the first measurement gap parameter to the terminal device, if the symbol information needs to be updated, determine a second measurement gap parameter according to updated symbol information; and send a message of updating system information to the terminal device through a paging process, and broadcast system information including the second measurement gap parameter; or send DCI or a paging message scheduled by the DCI to the terminal device through a paging process. The DCI and the paging message scheduled by the DCI carry the second measurement gap parameter.

In a possible embodiment, the one or more delay-related parameters are the delay offset information. The processor 1501 is further configured to: after the sending the first measurement gap parameter to the terminal device, if a difference between a current delay difference and the delay difference of the one or more delay-related parameters is greater than a preset threshold, or after a preset time gap, determine a third measurement gap parameter according to the current delay difference; and send the third measurement gap parameter to the terminal device. The current delay difference refers to a delay difference between the satellite service link corresponding to the serving cell and the satellite service link corresponding to the neighboring cell in a current time period.

It should be noted that the processor 1501 and the memory 1502 may be relatively independently disposed, or may be coupled. FIG. 15 takes one processor 1501 as an example, but in fact, the quantity of processors 1501 is not limited.

Figure 16:
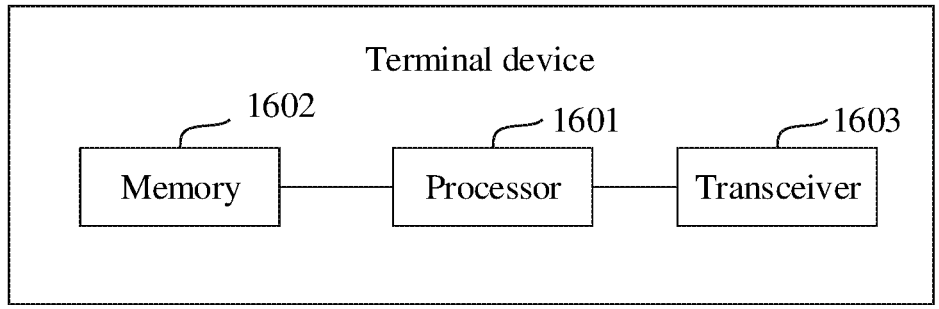
FIG. 16 is a second schematic structural diagram of a terminal device provided by an embodiment of the present disclosure.

On the basis of the second method for measurement synchronization, an embodiment of the present disclosure further provides a terminal device. As shown in FIG. 16, the terminal device includes: a processor 1601, a memory 1602, and a transceiver 1603.

The processor 1601 is configured to read one or more programs in the memory 1602 and execute the following processes: receiving a first measurement gap parameter sent by a network device, where the first measurement gap parameter is configured to instruct a measurement window actually corresponding to a synchronization signal block sent by a satellite service link corresponding to a neighboring cell in a serving cell; and measuring the synchronization signal block corresponding to the neighboring cell according to the measurement window.

In a possible embodiment, the processor 1601 is further configured to: receive the first measurement gap parameter through broadcast system information; or receive the first measurement gap parameter through dedicated signaling.

In a possible embodiment, the processor 1601 is further configured to: after the receiving the first measurement gap parameter sent by the network device, receive a message of updating system information sent through a paging process, and receive system information including a second measurement gap parameter; or receive downlink control information DCI or a paging message scheduled by the DCI through a paging process. The DCI and the paging message scheduled by the DCI are configured to instruct the second measurement gap parameter. A measurement window instructed by the second measurement gap parameter is different from the measurement window instructed by the first measurement gap parameter.

It should be noted that the processor 1601 and the memory 1602 may be relatively independently disposed, or may be coupled. FIG. 16 takes one processor 1601 as an example, but in fact, the quantity of processors 1601 is not limited.

On the basis of the first method for measurement synchronization, an embodiment of the present disclosure further provides a network device. Please refer to FIG. 17. The network device includes: a configuration module 1701: configured to configure one or more measurement gap parameters for a terminal device, where the one or more measurement gap parameters include a measurement window; and a sending module 1702: configured to send instruction information to the terminal device so that the terminal device may adjust the measurement window according to the instruction information, and measure a synchronization signal block of a neighboring cell according to the adjusted measurement window. The instruction information is configured to instruct one or more delay-related parameters of a satellite service link corresponding to a serving cell and a satellite service link corresponding to the neighboring cell.

In a possible embodiment, the sending module 1702 is further configured to: send the instruction information to the terminal device through broadcast system information; or send the instruction information to the terminal device through dedicated signaling.

In a possible embodiment, the instruction information includes one or more of public offset information, delay offset information, or location information. The public offset information includes a maximum delay difference between the satellite service link corresponding to the serving cell and the satellite service link corresponding to the neighboring cell. The delay offset information includes a real-time delay difference between the satellite service link corresponding to the serving cell and the satellite service link corresponding to the neighboring cell. The location information includes a satellite identifier corresponding to the serving cell and a satellite identifier corresponding to the neighboring cell, or the location information includes a location of a gateway station, the satellite identifier corresponding to the serving cell and the satellite identifier corresponding to the neighboring cell.

In a possible embodiment, the sending module 1702 is further configured to: if symbol information needs to be updated, notify the terminal device to update the symbol information in the following manner: sending a message of updating system information to the terminal device through a paging process, and broadcasting system information including updated symbol information; or sending downlink control information DCI to the terminal device through a paging process. The DCI is configured to instruct the terminal device to update the symbol information.

In a possible embodiment, the sending module 1702 is further configured to: after the instruction information is sent to the terminal device, for a neighboring cell at any frequency point, if a difference between a current delay difference and the delay difference in the instruction information is greater than a preset threshold, broadcast system information including the current delay difference, or send instruction information including the current delay difference to the terminal device through reconfigured dedicated signaling. The current delay difference refers to a delay difference between the satellite service link corresponding to the serving cell and the satellite service link corresponding to the neighboring cell in a current time period.

Figure 17:
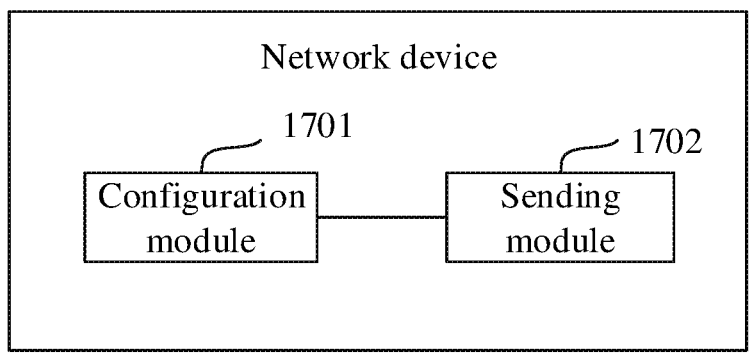
FIG. 17 is a third schematic structural diagram of a network device provided by an embodiment of the present disclosure.

As an embodiment, the configuration module 1701 and the sending module 1702 in FIG. 17 may be implemented through the processor 1301 in FIG. 13.

On the basis of the first method for measurement synchronization, an embodiment of the present disclosure further provides a terminal device. Please refer to FIG. 18. The terminal device includes: a determining module 1801: configured to determine one or more delay-related parameters, where the one or more delay-related parameters are configured to represent a delay between a satellite service link corresponding to a serving cell and a satellite service link corresponding to a neighboring cell; an adjusting module 1802, configured to adjust a measurement window according to the one or more delay-related parameters, where the measurement window is obtained from one or more measurement gap parameters configured by a network device; and a measuring module 1803, configured to measure a synchronization signal block corresponding to the neighboring cell according to the adjusted measurement window.

In a possible embodiment, the terminal device includes a receiving module 1804. The receiving module 1804 is configured to: receive instruction information through broadcast system information; or receive the instruction information through dedicated signaling sent by the network device. The instruction information is configured to instruct the one or more delay-related parameters.

In a possible embodiment, the instruction information includes one or more of public offset information, delay offset information, or location information. The public offset information includes a maximum delay difference between the satellite service link corresponding to the serving cell and the satellite service link corresponding to the neighboring cell. The delay offset information includes a real-time delay difference between the satellite service link corresponding to the serving cell and the satellite service link corresponding to the neighboring cell. The location information includes a satellite identifier corresponding to the serving cell and a satellite identifier corresponding to the neighboring cell, or the location information includes a location of a gateway station, the satellite identifier corresponding to the serving cell and the satellite identifier corresponding to the neighboring cell.

In a possible embodiment, the public offset information further includes symbol information, and the symbol information is configured to instruct that the maximum delay difference is a timing advance or a timing delay. The receiving module 1804 is further configured to: receive a message of updating system information sent through a paging process, and receive updated symbol information or an updated current delay difference for a neighboring cell at a specific frequency point through broadcast updated system information, where the current delay difference refers to a delay difference between the satellite service link corresponding to the serving cell and the satellite service link corresponding to the neighboring cell in a current time period; or receive instruction information including the updated current delay difference for the neighboring cell at the specific frequency point through reconfigured dedicated signaling; or receive DCI sent by the network device through a paging process, and update the symbol information according to an instruction of the DCL.

In a possible embodiment, the instruction information is the location information, and the determining module 1801 is specifically configured to: determine the one or more delay-related parameters of the satellite service link corresponding to the serving cell and the satellite service link corresponding to the neighboring cell according to the location of the gateway station, a pre-stored ephemeris, the satellite identifier corresponding to the serving cell, and the satellite identifier corresponding to the neighboring cell, or according to location information of the terminal device, the location of the gateway station, the pre-stored ephemeris, the satellite identifier corresponding to the serving cell, and the satellite identifier corresponding to the neighboring cell.

In a possible embodiment, the adjusting module 1802 is further configured to: before the synchronization signal block corresponding to the neighboring cell is measured according to the adjusted measurement window, determine an included angle between an antenna of the terminal device and a satellite corresponding to the neighboring cell according to the pre-stored ephemeris, the satellite identifier corresponding to the serving cell, and the satellite identifier corresponding to the neighboring cell; and adjust the antenna of the terminal device to a direction aligned with the satellite corresponding to the neighboring cell according to the included angle.

In a possible embodiment, the adjusting module 1802 is further configured to: if the public offset information does not include the symbol information, advance a starting time of the measurement window by the maximum delay difference, and prolong duration of the measurement window by twice the maximum delay difference; if the public offset information includes the symbol information, and the symbol information is configured to instruct that the maximum delay difference is the timing delay, prolong the duration of the measurement window by the maximum delay difference; and if the public offset information includes the symbol information, and the symbol information is configured to instruct that the maximum delay difference is the timing advance, advance the starting time of the measurement window by the maximum delay difference, and prolong the duration of the measurement window by the maximum delay difference.

Figure 18:
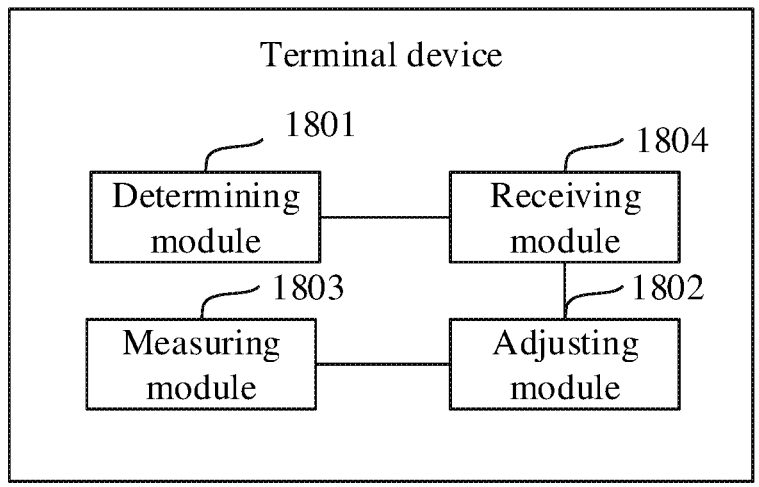
FIG. 18 is a third schematic structural diagram of a terminal device provided by an embodiment of the present disclosure.

It should be noted that the receiving module 1804 in FIG. 18 is an optional module.

As an embodiment, the determining module 1801, the receiving module 1804, the adjusting module 1802, and the measuring module 1803 in FIG. 18 may be implemented by the processor 1401 in FIG. 14.

On the basis of the second method for measurement synchronization, an embodiment of the present disclosure further provides a network device.

Figure 19:
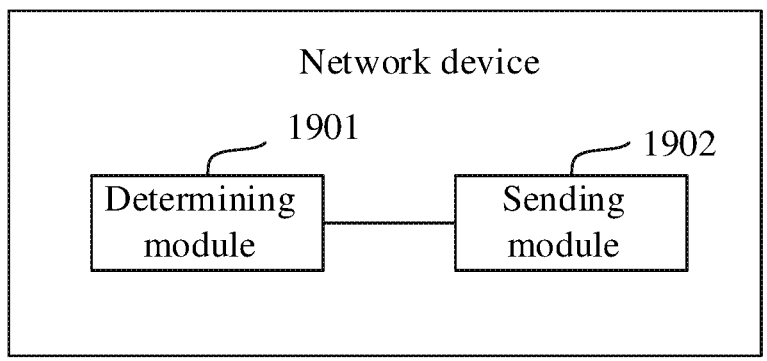
FIG. 19 is a fourth schematic structural diagram of a network device provided by an embodiment of the present disclosure.

As shown in FIG. 19, the network device includes: a determining module 1901, configured to determine one or more delay-related parameters of a satellite service link corresponding to a serving cell and a satellite service link corresponding to a neighboring cell, and determine a first measurement gap parameter according to the one or more delay-related parameters, where the measurement gap parameter includes a measurement window; and a sending module 1902, configured to send the first measurement gap parameter to a terminal device.

In a possible embodiment, the determining module 1901 is specifically configured to: determine a propagation distance difference between the satellite service link corresponding to the serving cell and the satellite service link corresponding to the neighboring cell according to a location of a gateway station, a pre-stored ephemeris, a satellite identifier corresponding to the serving cell, and a satellite identifier corresponding to the neighboring cell; or determine the propagation distance difference between the satellite service link corresponding to the serving cell and the satellite service link corresponding to the neighboring cell according to a location of the terminal device, the pre-stored ephemeris, the location of the gateway station, the satellite identifier corresponding to the serving cell, and the satellite identifier corresponding to the neighboring cell; and determine the one or more delay-related parameters of the satellite service link corresponding to the serving cell and the satellite service link corresponding to the neighboring cell according to the propagation distance difference.

In a possible embodiment, the sending module 1902 is further configured to: send the first measurement gap parameter to the terminal device through broadcast system information; or send the first measurement gap parameter to the terminal device through dedicated signaling.

In a possible embodiment, the one or more delay-related parameters include public offset information and/or delay offset information. The public offset information includes a maximum delay difference between the satellite service link corresponding to the serving cell and the satellite service link corresponding to the neighboring cell. The delay offset information includes a real-time delay difference between the satellite service link corresponding to the serving cell and the satellite service link corresponding to the neighboring cell.

In a possible embodiment, the public offset information further includes symbol information, and the symbol information is configured to instruct that the maximum delay difference is a timing advance or a timing delay. The determining module 1901 is further configured to: after the first measurement gap parameter is sent to the terminal device, if the symbol information needs to be updated, determine a second measurement gap parameter according to updated symbol information. The sending module 1902 is further configured to: send a message of updating system information to the terminal device through a paging process, and broadcast system information including the second measurement gap parameter; or send downlink control information DCI or a paging message scheduled by the DCI to the terminal device through a paging process. The DCI and the paging message scheduled by the DCI carry the second measurement gap parameter.

In a possible embodiment, the one or more delay-related parameters are the delay offset information. The determining module 1901 is further configured to: after the first measurement gap parameter is sent to the terminal device, if a difference between a current delay difference and the delay difference of the one or more delay-related parameters is greater than a preset threshold, or after a preset time gap, determine a third measurement gap parameter according to the current delay difference.

The sending module 1902 is further configured to: send the third measurement gap parameter to the terminal device. The current delay difference refers to a delay difference between the satellite service link corresponding to the serving cell and the satellite service link corresponding to the neighboring cell in a current time period.

As an embodiment, the determining module 1901 and the sending module 1902 in FIG. 19 may be implemented through the processor 1501 in FIG. 15.

On the basis of the second method for measurement synchronization, an embodiment of the present disclosure further provides a terminal device.

Figure 20:
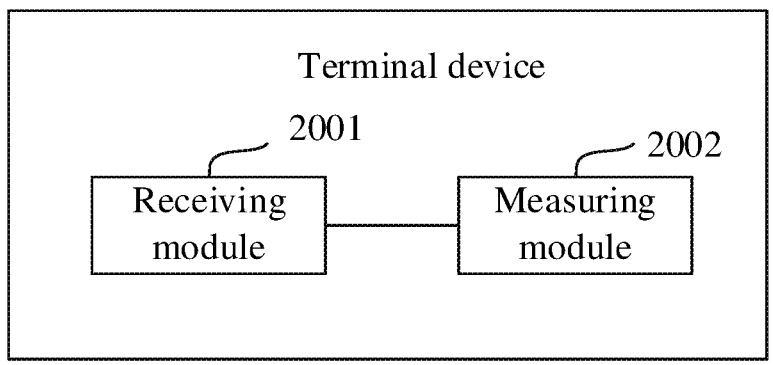
FIG. 20 is a fourth schematic structural diagram of a terminal device provided by an embodiment of the present disclosure.

As shown in FIG. 20, the terminal device includes: a receiving module 2001, configured to receive a first measurement gap parameter sent by a network device, where the first measurement gap parameter is configured to instruct a measurement window actually corresponding to a synchronization signal block sent by a satellite service link corresponding to a neighboring cell in a serving cell; and a measuring module 2002, configured to measure the synchronization signal block corresponding to the neighboring cell according to the measurement window.

In a possible embodiment, the receiving module 2001 is further configured to: receive the first measurement gap parameter through broadcast system information; or receive the first measurement gap parameter through dedicated signaling.

In a possible embodiment, the receiving module 2001 is further configured to: after the first measurement gap parameter sent by the network device is received, receive a message of updating system information sent through a paging process, and receive system information including a second measurement gap parameter; or receive downlink control information DCI or a paging message scheduled by the DCI through a paging process. The DCI and the paging message scheduled by the DCI are configured to instruct the second measurement gap parameter. A measurement window instructed by the second measurement gap parameter is different from the measurement window instructed by the first measurement gap parameter.

As an embodiment, the receiving module 2001 and the measuring module 2002 in FIG. 20 may be implemented through the processor 1601 in FIG. 16.

On the basis of the first method for measurement synchronization or the second method for measurement synchronization discussed above, an embodiment of the present disclosure further provides a computer-readable storage medium, storing computer instructions. When the computer instructions run on a computer, the computer may execute the first method for measurement synchronization discussed above, or the second method for measurement synchronization discussed above.

Those skilled in the art should understand that the embodiments of the present disclosure may be provided as a method, a system, or a computer program product. Therefore, the present disclosure may adopt the form of a complete hardware embodiment, a complete software embodiment, or an embodiment combining software and hardware. Moreover, the present disclosure may adopt the form of a computer program product implemented on one or more computer-usable storage media (including but not limited to a disk memory, a CD-ROM, an optical memory, etc.) containing computer-usable program codes.

The present application is described according to flowcharts and/or block diagrams of the method, the device (system), and the computer program product of the embodiments of the present disclosure. It should be understood that each process and/or block in the flowcharts and/or block diagrams, and the combination of processes and/or blocks in the flowcharts and/or block diagrams may be implemented by computer program instructions. These computer program instructions may be provided to a processor of a general-purpose computer, a special-purpose computer, an embedded processor, or other programmable data processing devices to generate a machine, so the instructions executed by the processor of the computer or other programmable data processing devices generate an apparatus configured to implement specified functions in one process or a plurality of processes in the flowcharts and/or one block or a plurality of blocks in the block diagrams.

These computer program instructions may also be stored in a computer-readable memory that may direct the computer or other programmable data processing devices to work in a specific manner, so the instructions stored in the computer-readable memory produce an article of manufacture including an instruction apparatus. The instruction apparatus realizes the specified functions in one process or a plurality of processes in the flowcharts and/or one block or a plurality of blocks in the block diagrams.

These computer program instructions may also be loaded on the computer or other programmable data processing devices, so a series of operation steps are executed on the computer or other programmable devices to produce computer-implemented processing. Thus, the instructions executed on the computer or other programmable devices provide steps configured to implement the specified functions in one process or a plurality of processes in the flowcharts and/or one block or a plurality of blocks in the block diagrams.

Although the preferred embodiments of the present disclosure have been described, those skilled in the art can make additional alterations and modifications to these embodiments once they learn the basic creative concept. Therefore, the appended claims are intended to be interpreted as including the preferred embodiments and all alterations and modifications falling within the scope of the present disclosure.

It will be apparent to those skilled in the art that various modifications and variations can be made in the present disclosure without departing from the spirit or scope of the present disclosure. Thus, it is intended that the present disclosure cover the modifications and variations of the present disclosure provided they come within the scope of the appended claims and their equivalents of the present disclosure.

What is claimed is:

1. A method for measurement synchronization, comprising:
    determining one or more delay-related parameters between a satellite service link corresponding to a serving cell and a satellite service link corresponding to a neighboring cell;
    determining a first measurement gap parameter according to the one or more delay-related parameters, wherein the first measurement gap parameter comprises a measurement window; and
    sending the first measurement gap parameter to a terminal device;
    wherein the one or more delay-related parameters comprise at least one of public offset information or delay offset information;
    wherein the public offset information comprises a maximum delay difference between the satellite service link corresponding to the serving cell and the satellite service link corresponding to the neighboring cell; and
    the delay offset information comprises a real-time delay difference between the satellite service link corresponding to the serving cell and the satellite service link corresponding to the neighboring cell.

2. The method according to claim 1, wherein the determining the one or more delay-related parameters between the satellite service link corresponding to the serving cell and the satellite service link corresponding to the neighboring cell, comprises:
    determining a propagation distance difference between the satellite service link corresponding to the serving cell and the satellite service link corresponding to the neighboring cell according to a location of a gateway station, a pre-stored ephemeris, a satellite identifier corresponding to the serving cell, and a satellite identifier corresponding to the neighboring cell; or determining a propagation distance difference between the satellite service link corresponding to the serving cell and the satellite service link corresponding to the neighboring cell according to a location of the terminal device, a location of a gateway station, a pre-stored ephemeris, a satellite identifier corresponding to the serving cell, and a satellite identifier corresponding to the neighboring cell; and
    determining the one or more delay-related parameters between the satellite service link corresponding to the serving cell and the satellite service link corresponding to the neighboring cell according to the propagation distance difference.

3. The method according to claim 1, wherein the sending the first measurement gap parameter to the terminal device, comprises:
    sending the first measurement gap parameter to the terminal device via broadcast system information; or
    sending the first measurement gap parameter to the terminal device via dedicated signaling.

4. The method according to claim 1, wherein the public offset information further comprises symbol information, and the symbol information indicates that the maximum delay difference is a timing advance or a timing delay; and
    after the sending the first measurement gap parameter to the terminal device, the method further comprises:
    in a case that the symbol information needs to be updated, determining a second measurement gap parameter according to updated symbol information; and
    sending a message of updating system information to the terminal device through a paging process, and broadcasting system information comprising the second measurement gap parameter; or
    sending downlink control information (DCI) or a paging message scheduled by DCI to the terminal device through a paging process, wherein the DCI and the paging message scheduled by the DCI carry the second measurement gap parameter.

5. The method according to claim 1, wherein the one or more delay-related parameters are the delay offset information; and
    after the sending the first measurement gap parameter to the terminal device, the method further comprises:
    in a case that a difference between a current delay difference and the delay difference of the one or more delay-related parameters is greater than a preset threshold, or after a preset time period, determining a third measurement gap parameter according to the current delay difference; and
    sending the third measurement gap parameter to the terminal device; wherein
    the current delay difference refers to a delay difference between the satellite service link corresponding to the serving cell and the satellite service link corresponding to the neighboring cell in a current time period.

6. A method for measurement synchronization, comprising:
    receiving a first measurement gap parameter sent by a network device, wherein the first measurement gap parameter indicates a measurement window actually corresponding to a synchronization signal block, and the synchronization signal block is sent by a satellite service link corresponding to a neighboring cell in a serving cell; and
    measuring the synchronization signal block corresponding to the neighboring cell according to the measurement window.

7. The method according to claim 6, wherein the receiving the first measurement gap parameter sent by the network device, comprises:
    receiving the first measurement gap parameter via broadcast system information; or
    receiving the first measurement gap parameter via dedicated signaling.

8. The method according to claim 6, after the receiving the first measurement gap parameter sent by the network device, comprising:

receiving a message of updating system information sent through a paging process, and receiving system information comprising a second measurement gap parameter; or receiving downlink control information (DCI) or a paging message scheduled by DCI through a paging process, wherein the DCI and the paging message scheduled by the DCI indicate the second measurement gap parameter;

wherein a measurement window indicated by the second measurement gap parameter is different from the measurement window indicated by the first measurement gap parameter.

9. A network device, comprising:
a processor, a memory and a transceiver; wherein
the processor is configured to read one or more programs in the memory and execute the method of claim 1.

10. The network device according to claim 9, wherein the processor is further configured to:
determine a propagation distance difference between the satellite service link corresponding to the serving cell and the satellite service link corresponding to the neighboring cell according to a location of a gateway station, a pre-stored ephemeris, a satellite identifier corresponding to the serving cell, and a satellite identifier corresponding to the neighboring cell; or determine a propagation distance difference between the satellite service link corresponding to the serving cell and the satellite service link corresponding to the neighboring cell according to a location of the terminal device, a pre-stored ephemeris, a location of a gateway station, a satellite identifier corresponding to the serving cell, and a satellite identifier corresponding to the neighboring cell; and
determine the one or more delay-related parameters between the satellite service link corresponding to the serving cell and the satellite service link corresponding to the neighboring cell according to the propagation distance difference.

11. The network device according to claim 9, wherein the processor is further configured to:
send the first measurement gap parameter to the terminal device via broadcast system information; or
send the first measurement gap parameter to the terminal device via dedicated signaling.

12. The network device according to claim 9, wherein the public offset information further comprises symbol information, the symbol information indicates that the maximum delay difference is a timing advance or a timing delay, and the processor is further configured to:
after the sending the first measurement gap parameter to the terminal device, in a case that the symbol information needs to be updated, determine a second measurement gap parameter according to updated symbol information; and
send a message of updating system information to the terminal device through a paging process, and broadcast system information comprising the second measurement gap parameter; or
send downlink control information (DCI) or a paging message scheduled by DCI to the terminal device through a paging process, wherein the DCI and the paging message scheduled by the DCI carry the second measurement gap parameter.

13. The network device according to claim 9, wherein the one or more delay-related parameters are the delay offset information, and the processor is further configured to:
after the sending the first measurement gap parameter to the terminal device, in a case that a difference between a current delay difference and the delay difference of the one or more delay-related parameters is greater than a preset threshold, or after a preset time period, determine a third measurement gap parameter according to the current delay difference; and
send the third measurement gap parameter to the terminal device; wherein
the current delay difference refers to a delay difference between the satellite service link corresponding to the serving cell and the satellite service link corresponding to the neighboring cell in a current time period.

14. A terminal device, comprising:
a processor, a memory and a transceiver; wherein
the processor is configured to read one or more programs in the memory and execute the following processes:
receiving a first measurement gap parameter sent by a network device, wherein the first measurement gap parameter indicates a measurement window actually corresponding to a synchronization signal block, and the synchronization signal block is sent by a satellite service link corresponding to a neighboring cell in a serving cell; and
measuring the synchronization signal block corresponding to the neighboring cell according to the measurement window.

15. The terminal device according to claim 14, wherein the processor is further configured to:
receive the first measurement gap parameter via broadcast system information; or
receive the first measurement gap parameter via dedicated signaling.

16. The terminal device according to claim 14, wherein the processor is further configured to:
after the receiving the first measurement gap parameter sent by the network device, receive a message of updating system information sent through a paging process, and receive system information comprising a second measurement gap parameter; or
receive downlink control information (DCI) or a paging message scheduled by DCI through a paging process, wherein the DCI and the paging message scheduled by the DCI indicate the second measurement gap parameter;
wherein a measurement window indicated by the second measurement gap parameter is different from the measurement window indicated by the first measurement gap parameter.

17. A non-transitory computer-readable storage medium, storing computer instructions, which are executed by a computer to cause the computer to perform the method according to claim 1.

18. A non-transitory computer-readable storage medium, storing computer instructions, which are executed by a computer to cause the computer to perform the method according to claim 6.

* * * * *